United States Patent [19]

Hall

[11] Patent Number: 5,699,184

[45] Date of Patent: Dec. 16, 1997

[54] USE OF STEREOSCOPIC DISPLAY SYSTEMS UTILIZING CHIRAL LIQUID CRYSTALS

[76] Inventor: Dennis R. Hall, 7075 SW. Hoodview Pl., Beaverton, Oreg. 97008

[21] Appl. No.: 314,142

[22] Filed: Sep. 28, 1994

Related U.S. Application Data

[63] Continuation-in-part of Ser. No. 929,673, Aug. 13, 1992, Pat. No. 5,398,131.

[51] Int. Cl.$^6$ .................................................. G02B 27/26
[52] U.S. Cl. .............................. 359/465; 359/464; 349/15
[58] Field of Search ................................. 359/462, 464, 359/465, 68, 63; 348/57; 349/15

[56] References Cited

U.S. PATENT DOCUMENTS

| | | | |
|---|---|---|---|
| 3,679,290 | 7/1972 | Adams et al. | 359/37 |
| 3,711,181 | 1/1973 | Adams et al. | 359/37 |
| 3,821,466 | 6/1974 | Roese | 348/56 |
| 4,021,846 | 5/1977 | Roese | 348/57 |
| 4,281,341 | 7/1981 | Byatt | 348/57 |
| 4,719,507 | 1/1988 | Bos | 348/57 |
| 4,884,876 | 12/1989 | Lipton et al. | 359/64 |
| 5,050,961 | 9/1991 | Venolia et al. | 359/465 |
| 5,113,285 | 5/1992 | Franklin et al. | 359/465 |
| 5,260,773 | 11/1993 | Dischert | 348/42 |
| 5,327,269 | 7/1994 | Tilton et al. | 359/63 |
| 5,398,131 | 3/1995 | Hall et al. | 359/465 |
| 5,457,554 | 10/1995 | Faris | 349/15 |

OTHER PUBLICATIONS

Faris, "Micro-Polarizer Arrays applied to a new class of Stereoscopic Imaging", SID 91 Digest, 1991, pp. 840–843, 1991.

Schadt and Funfschilling, "New Liquid Crystal Polarized Color Projection Principle", 1990 Jpn Jnl. of Appl. Phys., vol. 29, #10 pp. 1974–1984, 1990.

Maurer "Polarizing Color Filters made from Cholesteric LC–Silicones", SID 90 Digest, pp. 110–113, 1990.

Primary Examiner—Paul M. Dzierzynski
Assistant Examiner—Darren E. Schuberg

[57] ABSTRACT

Methods for presenting stereoscopic hardcopy and ethereal displays, using chiral liquid crystal materials are presented. The methods include displays of polarization encoded mixed images, which allow low repetition rate stereoscopic displays, compatible with current broadcast and motion picture standards.

42 Claims, 12 Drawing Sheets

Fig. 14
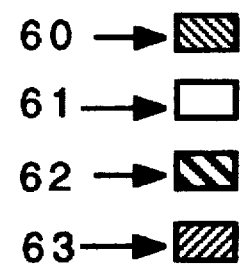
Fig. 15
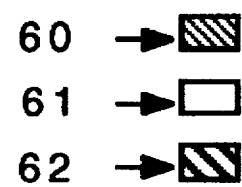
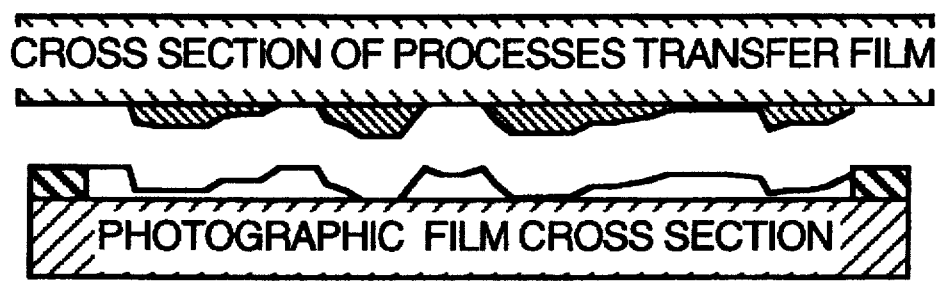
Fig. 16
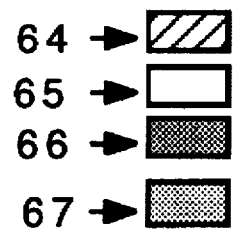
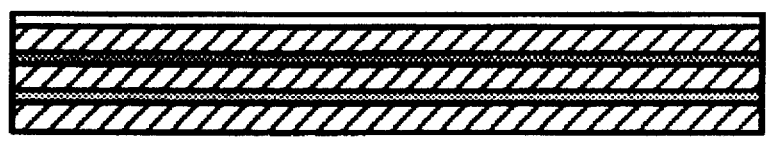

USE OF STEREOSCOPIC DISPLAY SYSTEMS UTILIZING CHIRAL LIQUID CRYSTALS

CROSS-REFERENCE TO RELATED APPLICATION

This application is filed as a continuation-in-part of patent application Ser. No. 07/929,673 filed Aug. 13, 1992, now U.S. Pat. No. 5,398,131.

BACKGROUND OF THE INVENTION

This invention concerns stereoscopic displays and recording systems that are in whole or in part, derived or facilitated by the use of cholesteric type liquid crystals, which can more generally be called Chiral Liquid Crystals (CLC), the nematic type being most common at the present time. It is expected that chiral smetic liquid crystals and possible other types of chiral liquid crystals will find application as filter and/or mirrors, similar in performance to the chiral nematic liquid crystal filter/mirrors. This is intended to be a "Use" application, based upon the "Process and Design" inventions of U.S. patent application Ser. No. 07/929,673 now U.S. Pat. No. 5,398,131, U.S. patent application Ser. No. 08/291,6666 and U.S. patent application Ser. No. 08/314,133, now abandoned and replaced by U.S. patent application Ser. No. 08/617,075. The contents of U.S. Pat. No. 5,398,131 and U.S. patent application Ser. No. 08/291,666 are hereby incorporated by reference herein.

In the history of projected stereoscopic displays, there have been two basic methods of encoding the Stereoscopic Perspective Views (SPVs) to the viewer's eyes. These are by means of color (anaglyphic) and polarization encoding of the light of the display. Anaglyphic methods, wherein the two SPVs are presented to the viewer, with the encoding light or inks being of two colors and the SPVs are decoded to the viewer's individual eyes by colored glasses, which transmit to each eye, substantially, only the SPV intended for that eye. This technology lacks the ability to produce a large color gambit. The technique was very popular about 40 years ago and is still used to some degree, largely in print applications because it is inexpensive. Polarization encoding became popular to some degree after Land's invention of reasonably inexpensive linearly polarizing filters. In this technique two projectors are used, with each projector presenting a polarization encoded SPV upon a polarization preserving display screen, such that the SPVs can be decoded to the viewer's individual eyes by polarization decoding glasses, which transmit to each eye, substantially, only the SPV intended for that eye. This system yields excellent full color images, but it suffers from many complexities, because the method involves recording two perspective views (the SPVs), and if motion is involved, time synchronizing the SPVs, displaying the SPVs through dual projectors and properly converging these pictures upon the display screen. These problems are eliminated by using "Time Sequential Stereoscopic Displays". Time sequential SPVs are displayed upon a screen and shuttered glasses are worn by the viewer, with the shuttering of the individual lenses of the glasses, synchronized with the display, allowing light to pass to each of the viewer's eyes, only at the time that the SPV for that eye is displayed upon the display screen. Roese (U.S. Pat. Nos. 3,821,466 & 4,021,846), Lipton (U.S. Pat. No. 4,884,876) and others have developed techniques for shuttered glasses.

Time sequential, polarization encoded SPVs from display devices, wherein passive polarization decoding glasses are worn by the viewer, which transmit to the viewer's individual eyes, only the SPV intended for that eye are described in patents by Byatt (U.S. Pat. No. 4,281,341) and Bos (U.S. Pat. No. 4,719,507). In the devices of this type, the SPVs are displayed time sequentially, a polarizer is placed in front of the display and an active cell, which can leave the polarization of the display unaffected or change the polarization to an orthogonal state, is placed between the display's polarizer and the viewer, so that SPVs, which are polarization encoded, are displayed time sequentially and with the decoding glasses, each of the viewer's eyes sees the SPV intended for that eye. These methods are presented in more detail in the Preferred Embodiments of this application. A more recent stereoscopic innovation is the interlaced, polarization encoded display, wherein the SPVs are presented simultaneously in an interlaced pattern. Each SPV is encoded to the viewer's individual eyes by an interlaced polarization inducing medium placed over the interlaced SPVs, such that the light transmitted to each of the individual's eyes is only the light from the SPV intended for that eye, when polarization decoding glasses are worn by the viewer. Venolia (U.S. Pat. No. 5,050,961) describes such a method, where the Polarization Encoding Medium (PEM) is placed upon a display device. And U.S. Pat. No. 5,398,131 and Faris describe using a PEM for hardcopy purposes.

Hall and Johnson (U.S. Pat. No. 5,398,131) describe a method of encoding photographic film with polarization inducing CLC material and laminating said encoded film to produce a film presenting both polarization encoded SPVs when projected upon a polarization preserving screen and having said polarization encoded SPVs, decoded to the viewer, by means of polarization decoding glasses, which transmit to each of the viewer's individual eyes only the image intended for that eye.

The last two methods will be reviewed in some detail in the body of this document.

In the past stereoscopic cameras have largely been duplicates of monoscopic cameras, with one exception being a camera for use with PEM displays. This is a video camera using the PEM technology to produce a display that is tailored for PEM type display devices. The video from this camera has both SPVs interlaced in each frame of video, so that when the video is displayed by a device having the proper polarizing stripes registered to the display, a stereoscopic image is observed by a viewer. The viewer wears polarization decoding glasses, wherein only the SPV intended for each of the viewer's eyes is presented to the eye for which it is intended. Such a camera is marketed by V Rex, a subsidiary of Revco, Inc. of Hawthorne, N.Y., but no description of its technology was found in the patent record, relative to a similar device of this invention.

SUMMARY OF THE INVENTION

This invention is based upon the special properties of inks, dyes and filter/mirrors utilizing CLC's, which have the physical property that depending upon the direction and rate of twist (pitch) of the molecules in the LC structure, the LC "ink" will reflect one color and handedness of light that is substantially circularly polarized, while transmitting all other colors and handednesses of the incident light, so that this light may subsequently interact with other species of the LC, i.e. those having different reflective color and/or handedness, Cf. Ref. Schadt, et al. In one of the simplest configurations of the stereo hardcopy method (U.S. Pat. No. 5,398,131), two printers are used, one using Right Hand (RH) CLC inks, i.e. LC inks that reflect Right Hand Circularly Polarized Light (RHCPL), and the other printer using Left Hand (LH) CLC inks. The printer using the RH LC inks will print the Right Eye (RE) SPV on a sheet of black media and the printer using the LH LC inks will print the Left Eye (LE) SPV on the same sheet, superimposed or intermixed with the RE's SPV. The orientation of the LC molecules (alignment) of the inks is critical, with some types of the CLC inks being self aligning, e.g. micro-encapsulated inks, and most other types of the CLC inks will readily align from the effect of an alignment layer or treatment of the substrate or the effect of being deposited upon an aligned LC layer. Then, by convention, the viewer wears glasses whose right lens transmits only RHCPL and the left lens transmits only Left Hand Circularly Polarized Light (LHCPL) so that when viewing this printed sheet, the RE sees only the RE SPV and the LE sees the LE SPV, whereupon most viewers will fuse these images in their brain and perceive a single stereoscopic image. Thus, through the use of these LC inks, high quality, full color, stereoscopic hardcopy can be quickly and easily generated from standard or slightly modified computer printers. Additionally, by using the LC inks in the subtractive rather than the additive mode, transparencies for direct view or projection use can also be made by these methods. These CLC inks are thus used to fabricate direct prints, transparencies and photographic projection film for either stereoscopic or monocular use, as well as fabricate PEM structures on prints, transparencies and photographic film for stereoscopic encoding and viewing. They may also be used to separate and combine colors of light for use in cameras and projectors, as shown in the Preferred Embodiments.

BRIEF DESCRIPTION OF THE DRAWINGS

FIG. 4 illustrates the configuration of staggered polarizing color elements in a three CLC layer PEM.

FIG. 14 illustrates the cross section of the product of the direct method (illustrated in FIG. 12) of LC ink encoding of photographic film.

FIG. 15 illustrates the cross section of the product of the indirect method (illustrated in FIG. 13) of LC ink encoding of photographic film.

FIG. 16 illustrates the cross section of a recombined emulsion set of one SPV.

DESCRIPTION OF THE PREFERRED EMBODIMENTS

Figure 1:
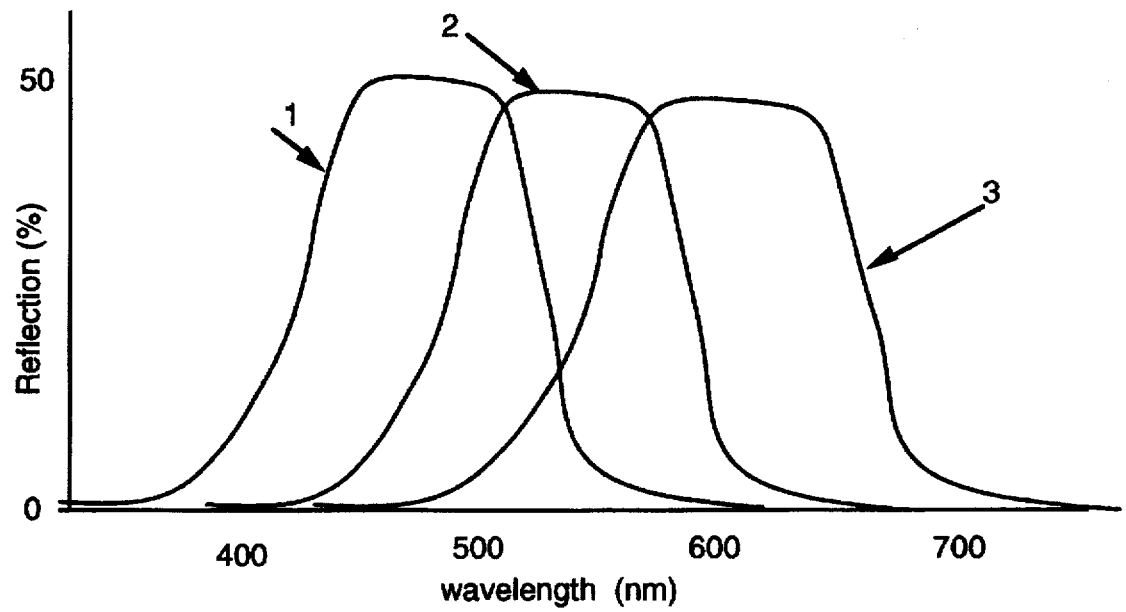
FIG. 1 is an illustration of the spectral response of CLC materials that are generally available from LC suppliers.

In FIG. 1, the spectral distributions for a family of LC inks (1, 2 & 3) are illustrated. These distributions were selected so that the combination of the LC inks will produce a white color in the reflective mode or a black in the transmission mode, i.e. where the combination of the inks will reflect all the light of one/or both handednesses incident upon them. A very acceptable white in the reflective mode can be obtained without reflecting all the incident light, but these same inks will yield a washed-out or low contrast black in the transmission mode. There is no specific number of required LC inks for stereoscopic display.

Figure 2:
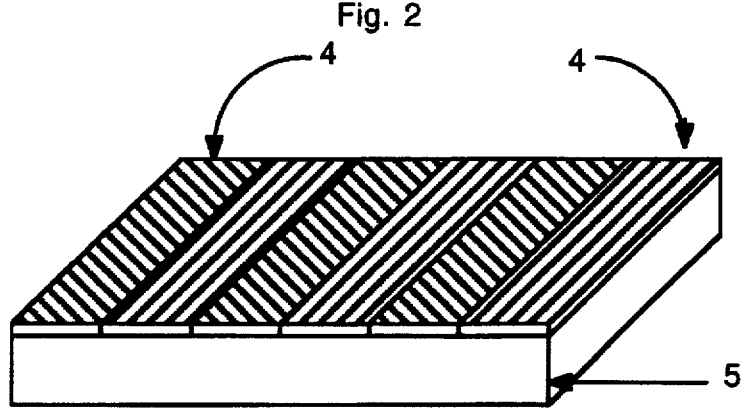
FIG. 2 illustrates an unwritten PEM. Polarizing stripes (4) of alternating handedness are printed adjacent to each other.
Figure 3:
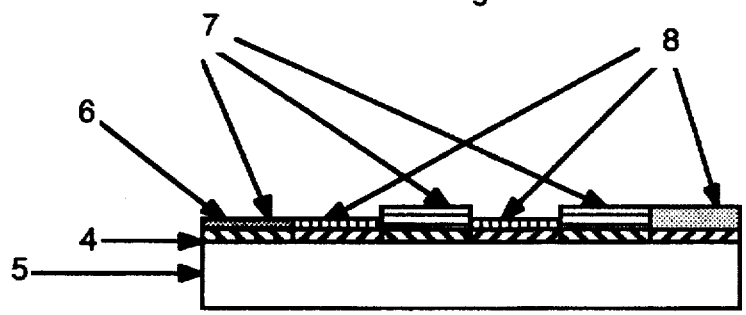
FIG. 3 illustrates a written PEM. Where transparent inks (6) are printed on the polarizing stripes (4) of FIG. 4. The SPVs (7 & 8) are printed in an interlaced manner.
Figure 4A:
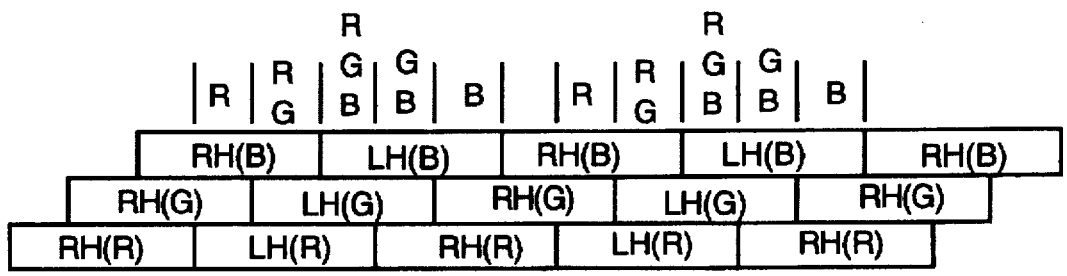
FIG. 4a illustrates staggered polarizing color elements having ⅓ overlap or stagger with each color of both handednesses in a layer dedicated for that color and stagger of colors of a single handedness being linearly displaced.

While the CLC inks can be configured in several ways, as described in the U.S. Pat. No. 5,398,131, the embodiment that is most applicable in the devices of the present application is a LC ink developed by Wacker Chemie GmbH of Munchen (Munich), Germany. The company identifies these materials as "Crosslinkable Cholesteric LC-Silicones" (CCLC-S). These inks become highly liquid only at somewhat elevated temperatures (60° to 90° C.), which Wacker Chemie refers to as the "activation temperature". This is also the temperature at which the material assumes its LC properties and at which temperature the alignment of the LC must be performed. The LC can then be made into solid films by either a photo or thermal "set" process, when suitable agents are added to the material, cf. Ref. Maurer, et al. An application for this CLC ink as well as such LC inks in other forms, is in the fabrication of what has been called a Polarization Encoded Medium (PEM). PEM structures are described in Disclosure Document Number 260862 filed with the U.S. Patent and Trademark Office on Aug. 16, 1990; U.S. patent application Ser. No. 5,398,131; Venolia patent, U.S. Pat. No. 5,050,961; and Faris. In its simplest form, a PEM is a piece of print media containing an array of alternating handedness, polarizing stripes used to encode spatially distributed SPVs, which when viewed with polarization decoding glasses will direct the individual perspective views to the intended eye of the viewer (the stripes are referred to as "tiles" by Venolia and Faris calls them "micro polarizers" or "micro-pols"). In this embodiment of the invention a PEM can be fabricated by merely printing and aligning the CLC in stripes with some or all the colors of LC inks, superimposed and having alternating handedness between adjacent polarizing stripes (4) on the print media (5), in FIG. 2. The details of the printing and aligning processes for various formulations of the CLC inks can be found in the aforementioned U.S. Pat. No. 5,398,131. And, when printed on a transparent medium, the PEM can be used to encode electronic displays, e.g. LC, Plasma or Electroluminescent (EL) panels, for stereoscopic displays, following the teachings of Venolia. And in the hardcopy application, a SPV (7 or 8) is printed on each set of encoding stripes (4) having the same handedness and printed with conventional nonscattering transparency inks (spectral filters) or waxes (6), in FIG. 3. These transparency inks have the property of absorbing light of a particular color in proportion to the number of color centers in the ink, which is generally proportional to the amount of ink used. In photographic film however, the number of color centers remaining in the emulsion, is proportional to the number of color centers activated in the exposure process. The color of the ink in this case is defined by the color which it absorbs, being matched to the colors reflected and transmitted by the PEM layers. Where no ink is deposited on a PEM element, that color is reflected and transmitted (on transparency media). To obtain "white", no ink is deposited and to produce "black" all colors matching the PEM layers are deposited. When a PEM is used on photographic film, the color layers of the film serve the same function as the transparency inks. Thus in both reflection and transmission, the encoding of the PEM is a subtractive or color negative process. In this way the polarization encoding function of the display is separated from the spatial intensity and color encoding of the SPVs. But this comes at the expense of a sizable loss of spatial resolution in the stereoscopic display. The loss of spatial resolution and the appearance of "dead areas" in the display can be reduced by several means. One such means is illustrated in FIGS. 4, where each polarization encoding CLC layer of the PEM is laterally displaced or misaligned relative to the other CLC color layers. Thus when properly "encoded" with the SPVs, the images intermix to some degree. Some of the colors in the two SPVs become slightly displaced in one direction, with the displacement remaining small enough that the eye will merge the colors into the desired combination color. The displacement of the color elements creates, what might be called "color pixels", with a color pixel being a segment of a polarizing element that can produce a portion of the image of a SPV in a color or a combination of colors that are different than the color or combination of colors of other pixels of the polarizing element. On the top of FIG. 4a, is shown the colors (designated as R, G & B), of the color pixels reflecting left handed (LH) CPL. In most cases there are, within the polarizing element, pixels that produce a combination of the primary colors and others that produce only primary colors. So, when a combination color is presented, the eye must merge the colors of the primary only pixels and sometimes the colors from some of the combination color pixels to perceive the displayed color. Having pixels that are producing the combination of colors being displayed, appears to help the eye merge those colors that are individually displayed. This allows greater displacement of the unmerged primary colors, yielding the possibility of larger color polarizing elements. FIGS. 4 illustrates some, of the many possible patterns of this "Staggered PEM" (SPEM).

Figure 4B:
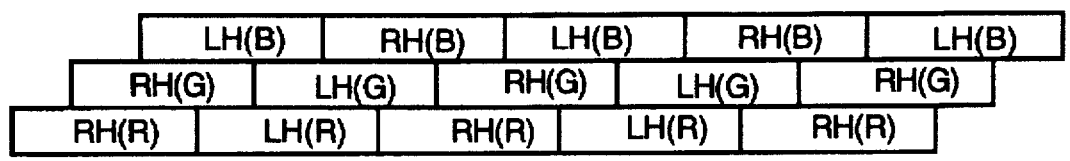
FIG. 4b illustrates staggered polarizing color elements having ⅓ overlap or stagger with each color of both handednesses in a layer dedicated for that color and stagger of colors of a single handedness not being linearly displaced.

FIG. 4a & 4b are one third overlap or stagger designs and yield the same result. For a white color in the display, the gap between the polarizing elements of the two SPVs is only ⅓ as large as the conventional (aligned color elements) PEM. For two colors in the display, the gap is increased to ⅔ as large as the gap of a conventional PEM. And for colors that are not merged within a pixel, the distance between the centers of the pixels of merging colors is the width of one color element, both within the polarizing element (intra PEM) and between polarizing elements of the same SPV (inter PEM). In each case there are five color pixels per polarizing element, with a color pixel capable of producing white (or any combination of all colors) and four pixels producing primary colors or certain combinations of primary colors (at any combination of the two colors of the pixel).

Figure 4C:
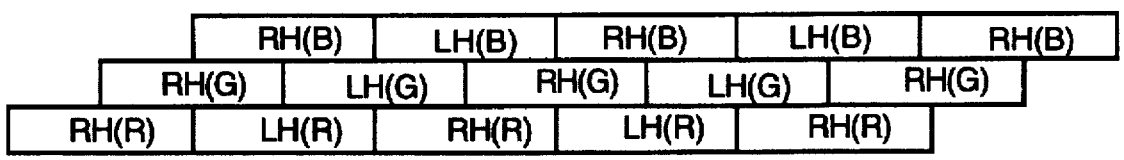
FIG. 4c illustrates staggered polarizing color elements having ½ overlap or stagger with each color of both handednesses in a layer dedicated for that color and stagger of colors of a single handedness being linearly displaced.
Figure 4D:
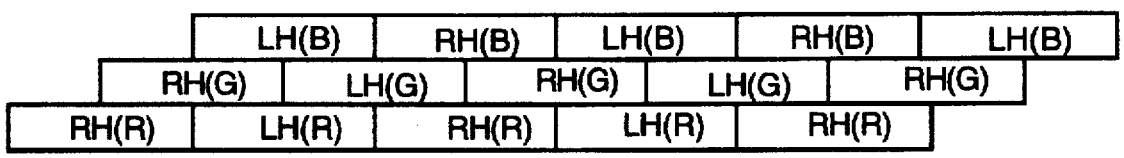
FIG. 4d illustrates staggered polarizing color elements having ½ overlap or stagger with each color of both handednesses in a layer dedicated for that color and stagger of colors of a single handedness not being linearly displaced.

FIG. 4c & 4d, are half or 50% overlap designs, which offer additional compromises. In the design of FIG. 4c, there are only four color pixels per polarizing element, none of which produce a "white", yet for a white object in the image (SPV) there are no dead areas or gaps in the image between the polarization elements of each SPV and again the centers of the pixels requiring color merging by the eye are separated by the width of one color element (edge separation of these pixels is one half of a color element's width), both intra and inter PEM. In the design of FIG. 4d, there are only three color pixels per polarizing element. One pixel can produce white, another pixel can produce any combination of two colors and the third pixel produces a primary color. The gaps in the image between the polarization elements of each SPV are large, ranging between one half color element for white and two combination colors and a full color element for the other colors. This offers a considerable disadvantage relative to the other SPEM configurations. By using the SPEM technique, larger PEM polarizing elements can be used, which is of advantage in some applications, such as on photographic film, where the PEM elements must be made very small.

The printing or writing of these SPEMs is performed much like that of any other PEM, with the exception that in some applications the color of the PEM element, as well as the handedness of the element must be identified before writing the proper SPV over it. In other applications, such as on photographic film, the assignment of the "designated write areas" are made by the PEM itself, and the proper registration of the PEM to the write areas is automatic.

The reason that a SPEM and other methods of intermixing the SPVs, to be revealed later, greatly improve the display are based upon human perception. The SPEM gives improved edge definition of objects in the image, while reducing the color definition, which is to say that the SPEM yields higher spatial frequency, while lowering the color frequency. And the high spatial frequency is very important in the perception of objects in an image, while the color frequency is relatively unimportant. The human brain easily fills the color to the edges of the objects in the image, but it has difficulty in creating edges on poorly defined objects in an image. Means are revealed throughout this application whereby greater definition of the SPV images are obtained.

Figure 5:
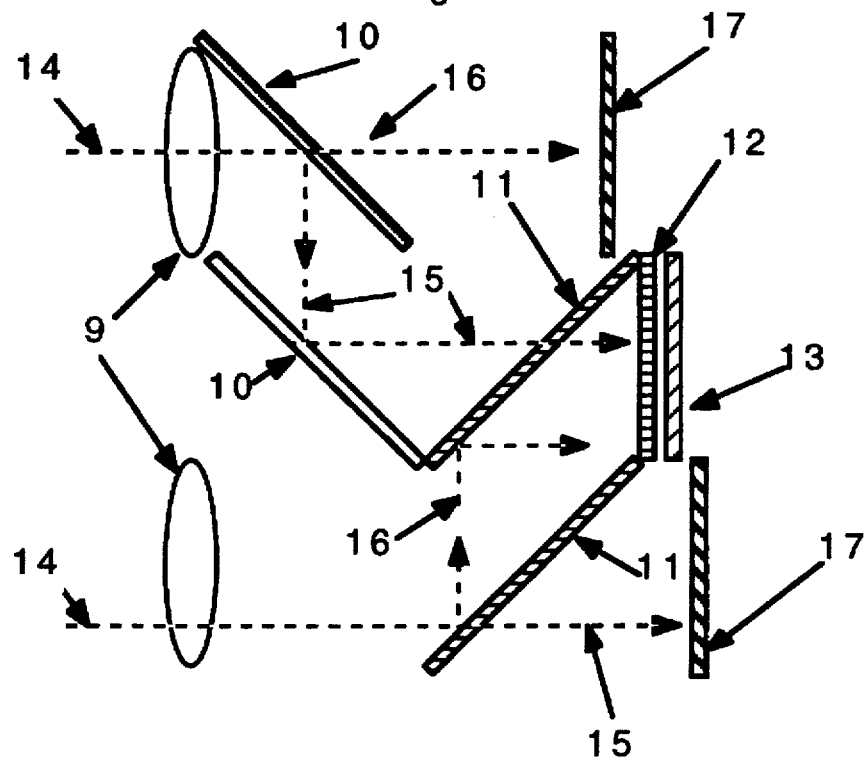
FIG. 5 illustrates a stereoscopic camera using CLC filter/mirrors (10 & 11) to direct, polarize and combine the light from two stereoscopic perspective views of a scene, onto a light sensitive target (13), containing a PEM (12).

The PEM can be used in either the reflective or transmissive display modes. For a transmissive display, a transparent medium will be used and light can be passed through the PEM in either direction (if a nonbirefringent medium is used), for either a direct view or projection display. The applications for the PEM in this patent application are primarily derived from the fact that in using the CLC inks, inexpensive PEM structures can be readily made on a variety of materials. Thus it becomes practical to use PEM encoding of stereoscopic displays where great quantities of PEM would be required. One such application is transparency display media, which when properly encoded, can be used with the common overhead projector. Such encoding can be done on an unmodified or slightly modified printer, by writing the proper SPVs upon the CLC polarization encoding stripes. A further application is the polarization encoding of photographic film, and in particular, motion picture film. FIG. 5 illustrates a simple stereoscopic camera, for use with a PEM target. This design also uses CLC filter/mirrors to polarize the light for the two SPVs and combine the SPVs upon the target. Referring to FIG. 5, the camera consists of two objective lenses (9), capturing the light to form individual SPVs, and a number of three layer CLC filter/mirrors (10 & 11). The CLC filter/mirror #10 reflects all colors of one handedness of Circular Polarized Light (CPL), while the filter/mirror #11 reflects all colors of CPL of the opposite or orthogonal handedness. Each set of filter/mirrors transmit all colors of CPL other than that which the filter/mirror reflects, so that these elements act as both a filter and a mirror in this device. The remaining elements of FIG. 5 are the PEM (12) and the target (13). In most cases these elements are combined into a single unit, e.g. a PEM printed on photographic film or a PEM printed on a CCD array, of a video camera. In FIG. 5, unpolarized light (14) enters the camera through the objective lenses (9), whereupon it encounters the first CLC filter/mirrors. In the upper segment of the illustration, it is shown that one handedness of the unpolarized light (14) is reflected as CPL of one handedness (15), whereas the other handedness of CPL (16) is transmitted by the initial filter/mirror (10) and the initial filter/mirror (11) of the lower segment of the illustration, reflects and transmits the opposite handednesses of CPL. The transmitted CPL of both segments is directed to light absorbers (17) and the reflected light of each segment is again reflected by another CLC filter/mirror of the same type as each segment's initial filter/mirror. But if individual color filter/mirrors are used, rather than a multi-layer filter, where one very thin (few micron) layer (color and handedness reflecting CLC) is deposited directly upon another, then the first and third filter layers should be reversed between the first and second CLC filter/mirror, in order to maintain the same path-length for all colors of the light directed to the target.

As noted, the filter/mirrors (11) of the lower segment of the illustration are transmissive to the CPL reflected by the upper segment filter/mirrors (10), so that the light forming both SPVs can be combined at the lower segment's second filter/mirror. The combined polarization encoded light of both SPVs to the PEM (12), with the PEM allowing the light from each SPV is thus sent to reach portions of the target (13), only in that area of the target assigned for that SPV. In the case of photographic film, this assignment is the assignment made by the PEM itself. Exposing the film's emulsion through the PEM will generally require exposing the emulsion through the emulsion's substrate as well, since it is very difficult to apply the PEM directly to the emulsion and maintain its integrity throughout the processing of the film. So that in the exposure of the film, the light will generally first pass through the PEM, then the film's backing or substrate and finally into the emulsion, where the exposure occurs. And in projecting the image contained on the film, the light will generally first pass through the pictorially encoded emulsion, then the film's substrate and finally through the polarization encoding PEM. And when used in this way, any birefringence that may exist in the film's substrate or emulsion has no consequence upon the display.

A PEM encoded film is very difficult to copy, particularly if there are irregularities in the PEM pattern, because the complete SPVs do not exist in any frame of the film and without the complete SPVs, making a good quality copy is virtually impossible since the PEM elements of the master and copy would have to be aligned and kept aligned, for every frame throughout the entire copy process. This would involve frame by frame matching, in the dark so as not to expose the copy film. So, PEM copies can be sold without any concern that they might be copied. To make PEM film copies from the master film utilizing the above process, the image of the master film is projected upon the PEM encoded copy film. And making PEM film copies from the conventional two camera process or from stereoscopic video tape(s) is very simple, with the PEM camera of FIG. 5, configured as a "copy camera", where the two rolls of master film are merely projected through the lenses (9), and the light is polarization encoded by the filter/mirrors (10 & 11), combined and impinged upon the PEM encoded copy film, which is as simple as making any other film copy. In spatially polarization encoding (PEM) displays, one normally thinks of the period of the encoding stripes or other pattern to be very fine, so as not to be easily resolved by the eye, but in one variation of the PEM display this is not the case. In this application, the PEM is used to temporally polarization encode a refreshed display, as illustrated by having the PEM elements placed upon motion picture photographic film, wherein the period (one stripe or other pattern element of each polarization) of the PEM may extend over two frames of the film. Even when the polarization encoding is done on a much finer basis, the pattern relative to the frame format, may not necessarily repeat for two frames of the film. In this way, the encoding stripes or pattern of the individual SPV can be interlaced to present a complete SPV for each eye. When PEM or SPEM encoded images are interlaced in this way, the complete complement of colors are produced for each color pixel area, on a temporal or frame sequential basis.

In the PEM display of the prior art the two SPVs are spatially interlaced and there is no temporal interlacing of the individual SPVs, so that only half of each SPV is presented to the viewer. This presents good stereoscopic effects for to most viewers, particularly if the picture is rapidly changing, e.g. a moving scene. And in this configuration, the film and shutter speed can remain at the standard rates with no noticeable increase of "flicker", but one half of each SPV is lost. However, when the individual SPVs are interlaced temporally to present a complete picture of each SPV, flicker becomes very noticeable if the film and shutter speeds are not increased, so that operating in this mode consumes more film, but not necessarily substantially more film. It appears that the increased film and shutter speeds are very dependent upon the pitch of the PEM used. The coarser the pitch of the PEM, the greater the required film and shutter speed, for most viewers to be comfortable with the display. In one embodiment of this invention, unique to the CLC type of PEM, the apparent flicker is greatly reduced in most applications. This technique is to use polarizing elements of mixed handedness, the most successful combination of handednesses is usually found in making the PEM reflect or transmit green light of one handedness and red and blue of the opposite handedness, in every segment of the PEM. This technique is based upon two factors of human visual perception: first the eye is most sensitive to green light and most colors contain at least some green light; secondly, human awareness of flicker is increased when viewing brightly illuminated images, of generally desaturated colors, which by definition contain a large mount of the white component. Thus, when viewing such images with mixed handedness PEM elements, each eye receives stimulation from all parts of the display of bright objects in the image, in every frame. The viewer receives the different component colors or color fields of the image time sequentially, i.e. the green field in one frame and what ever other colors are mixed with the green to form the displayed color, in the next frame, and the repetition frequency is sufficient to blend the colors and minimize the apparent flicker. The physiology of this technique is that the black and white receptors of the eye (rods) have a much faster response time and thus detect changes, such as flicker of the display, far more readily than do the color receptors (cones) of the eye.

While cones respond only to specific colors, the rods respond to all colors, so to prevent flicker, the rods must be stimulated more frequently than do the cones, which is what this technique does. The response time of both rods and cones is intensity or brightness dependent. These sensors respond more quickly to bright objects in the image field, than to dim objects in the field, so that it is most important to have a higher refresh rate, for bright objects in the image field, which is again what this technique does.

With the technique as presently described, the light for each SPV is of a single handedness or orientation and total spectrum circular polarizers can be used in the lenses of the decoding glasses. But, in order to minimize ghosting in the blue and red colors of the display, it is desirable to make the filters of the glasses from CLC filter/mirror materials. Ghosting is the effect of the unwanted image in any eye's SPV. It may also be advisable to incorporate "centiwave" retarding elements in the lenses of these glasses, Cf. U.S. patent application Ser. No. 08/291,666, which describes the design and function of the centiwave elements. The purpose of the centiwave element is to minimize any elliptical polarization in the component colors that are to be reflected by the CLC filter/mirrors, thus eliminating the undesired SPV from the light transmitted by the lens (CLC filter/mirror). It is also possible to make decoding glasses with CLC "notch" filter/minors in them. A notch filter is a filter that eliminates a small spectral band of light. The reason that glasses having notch filters in them may be desirable, results from cases where the display light is broad spectrum and there is a poor merging of the spectral distributions of CLC filter/mirrors used in the glasses or certain other display elements, in which case, some amount of undesired light will be allowed to be transmitted by the CLC filter/mirrors.

If the display system has narrow spectrum component colors and the spectral distributions of the CLC filter/mirrors are matched to these colors, the notch filter/mirrors are not required. Generally notch filter/mirrors will reduce the brightness of the display slightly and minimize any ghosting of the images. But if the colors of the display light have any spectral distribution at all and all such colors do, or if that component color does not occur at the center point of the spectral distribution of the CLC filter/mirror, then some infinitesimal amount of ghosting will exist. This is because the light reflected and transmitted by the CLC filter/mirrors is truly circularly polarized only at the center frequency of the distribution and the light other than this frequency becomes very slightly elliptically polarized, with the degree of ellipticity of the polarization increasing rapidly at the edges of the distribution. Thus a notch filter removes any light from the region that the CLC filter/mirror looses its reflecting ability. A CLC notch filter/mirror is merely a narrow band filter/mirror reflecting one or both handednesses of light incident upon it.

Figure 6:
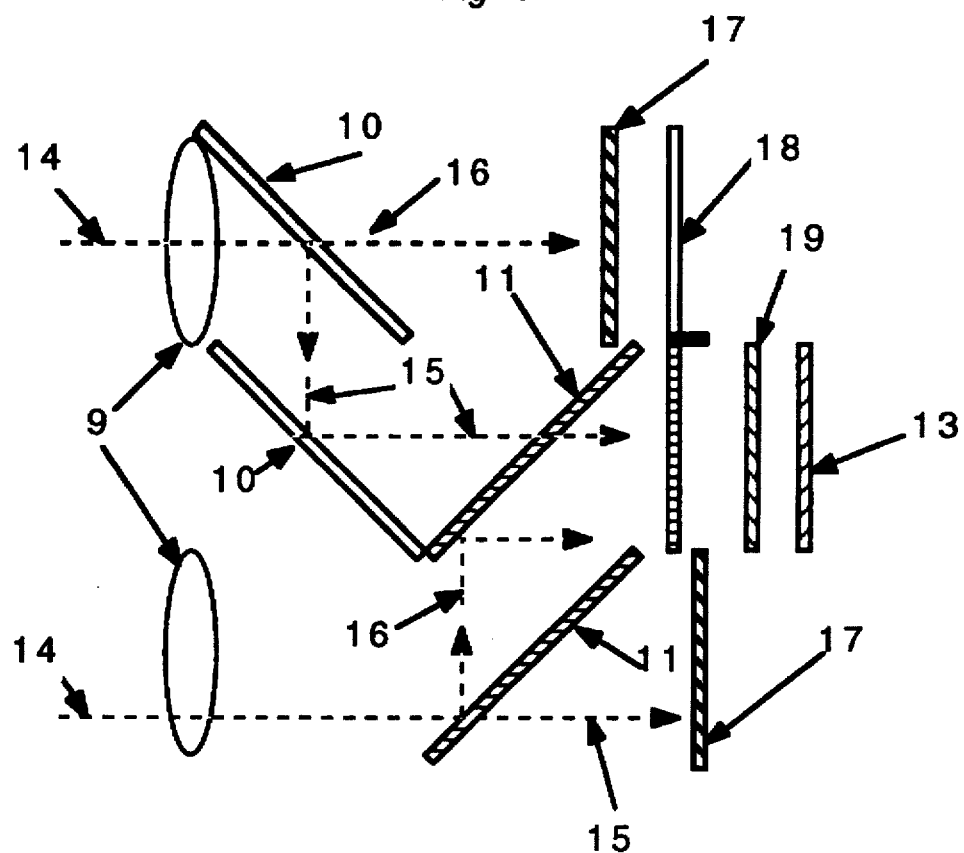
FIG. 6 illustrates a stereoscopic camera using CLC filter/mirrors (10 & 11) of mixed polarization handedness to direct, polarize and combine the light from two stereoscopic views of a scene, onto a light sensitive target (13), with said light being polarization switched by retarding element (18) and modulated by a polarizer (19).
Figure 7:
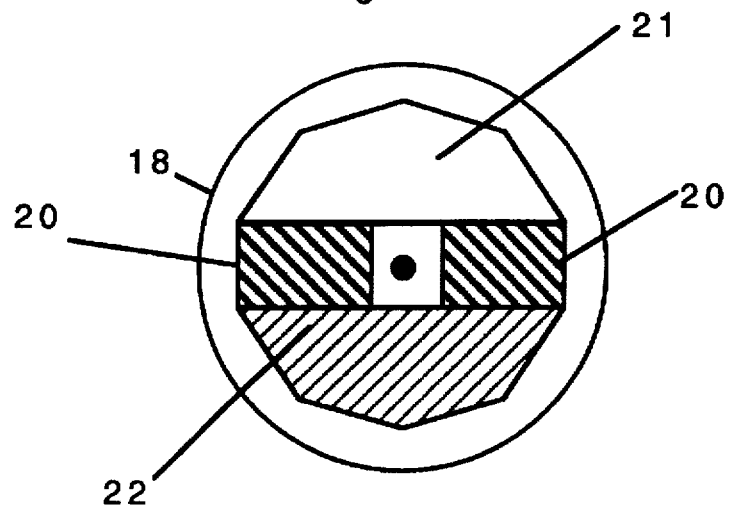
FIG. 7 illustrates an end view of the polarization switching and shuttering element 18 in FIG. 6.

It is also possible to make decoding glasses with the CLC materials that transmit to each eye, light of mixed polarization handedness or orientation. There are reasons that such a configuration may be desirable. With mixed handedness lenses in the decoding glasses it becomes possible to mix the images of the two SPVs in a single PEM polarization element, that element having only one polarization orientation. The merit of this lies in the fact that stereoscopic cameras and projectors can be designed that operate with ordinary color film and either mechanically or electronically perform the function of the PEM. Such a camera is illustrated in FIG. 6. This camera is similar to the camera of FIG. 5, and operates much the same. There are two embodiments of the camera, with both embodiments producing the same stereoscopic encoded photographic film or video signals. A stereoscopic display is produced when the developed film or video signals are "played back" through the special projector of FIG. 10. Both embodiments of the camera encode the stereoscopic pictures on common color transparency photographic film or a video target. In the first embodiment, the camera directs the light of the scene exactly as the camera of FIG. 5, until the light of the two SPVs reaches element #18, which is a shutter (20) and a switchable retarding polarization inverter (21 and 22), illustrated separately in FIG. 7. This element has been illustrated as a rotating disk with two windows (21 and 22), through which the light can pass, for the purpose of impressing an optical image upon the target (13) in FIG. 6. For the display of motion pictures as in the projector of FIG. 10, four windows, with two windows of the same type placed together, would generally be used, since each frame of film is double shuttered. The target can be either photographic film or a video pickup target, such as a CCD. One window in the disk may be an aperture or a transparent non-birefringent medium. The second window contains a half wave optical retarder, which when placed in the light beam will invert or change the handedness of the Circularly Polarized Light (CPL) passing through it. The shutter element (18), could also be a linear shutter arrangement or a mechanical shutter with an electro-optical variable retarder, such as those cells which vary the retardation of a birefringent liquid crystal and thereby switch between a half wave of retardation to an element having no or a very slight degree of retardation. Thus, CPL from both SPVs, is either shuttered "off", when the film advances or the video target is "readout", or the light is allowed to pass through one or the other windows of the shutter. When the CPL of both SPVs pass through one of the windows of the shutter, it impinges upon element #19 of FIG. 6, which is a CLC filter/mirror, having three CLC layers, with two of the layers reflecting CPL of one handedness and the third LC layer, reflecting CPL of the opposite handedness. Each of the CLC layers reflects one of the colors of light to which the film is sensitive. And if the film is sensitive to more than three principle colors, then more CLC layers are used. The handedness of the light reflected or transmitted being somewhat balanced to transmit about equal brightness (brightness being a subjective measure of luminous flux density) of each handedness of the light to the target (13).

Some mount of unwanted light from the two SPVs will pass through the CLC polarizer (19) because the half wave retarding window can not be made to give the same amount of retardation for all colors. But to achieve a balance in the amount of unwanted light (from elliptical polarization) in the two SPVs and possibly keep the unwanted light below the reciprocity level of the film, centiwave retarders can be incorporated into some of the CLC layers of the final polarizer (19). The light not reflected by the final polarizer (19), is transmitted to the target (13). This light will contain the light from one SPV in two colors and the light from the other SPV in the third color. And when the light passes through the other window in the shutter (18), which occurs in the next frame of the film or frame of video, the light arriving at the target will be of one color of the said one SPV and two colors of the said other SPV, completing both SPVs.

In the second embodiment of this camera (FIG. 6), the light directing and polarizing CLC filter/mirrors (10 & 11), have CLCs of mixed handedness, so that the CPL arriving at the shutter (18) is of mixed handedness within each SPV. The shutter (18) performs as described earlier, but the final polarizing filter (19) is a single handedness circular polarizer. With this arrangement, the amount and color of the light arriving at the target (13) is substantially the same as that in the previous embodiment. In the use of CLC filter/mirrors controlling colored light, it is preferable if the spectral distribution of the colored light is somewhat narrower than that of the CLC controlling each specific color. Which can be done through the use of "notch filters". The use of notch filters will reduce the brightness of the display or increase the required exposure of a camera, but it also increases the color gamut and reduces an apparent flicker, which can occur for certain colored objects in the stereoscopic display.

Because some of the color is presented to the viewer "time sequentially", one might think that color integrity and edge definition of rapidly moving objects in the stereoscopic image might be lost, but this is not the case. All the colors of the object exist in each frame and only the balance of colors to each eye of the viewer changes frame to frame, which the viewer's brain seems to integrate very well.

Figure 8:
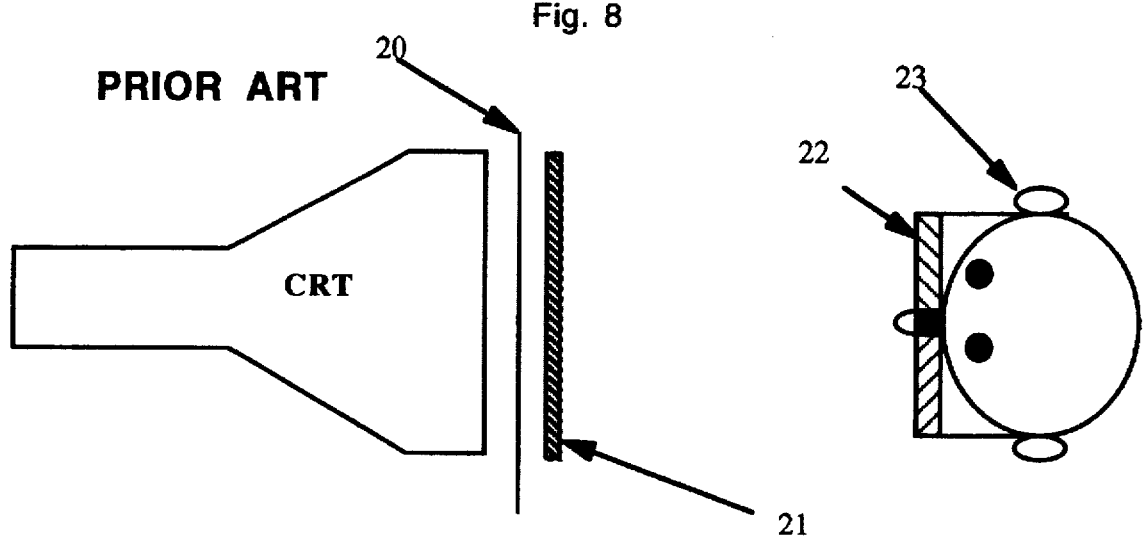
FIG. 8 illustrates the stereoscopic display of Byatt and Bos.

Thus, this technique can be used for many applications, including stereoscopic TV, without having to substantially increase the bandpass of the signal or modify the frame rate of the receivers. This is done by slight modification of the stereoscopic displays of Byatt, U.S. Pat. No. 4,281,341; Bos, U.S. Pat. No. 4,719,507 as well as the active glasses of Lipton, et al, U.S. Pat. No. 4,884,876. These methods also minimize the switching time required of the LC polarization switching cells of these devices, resulting in less "ghosting" of the undesired SPV in the displays. The Byatt device is illustrated in FIG. 8, where the unpolarized light from the CRT becomes polarized by linear polarizer (23) and passes into a twisted nematic (TN) cell (24), which can be switched to either rotate the plane of polarization by 90° or leave the orientation of the plane polarized light unaltered.

Figure 9:
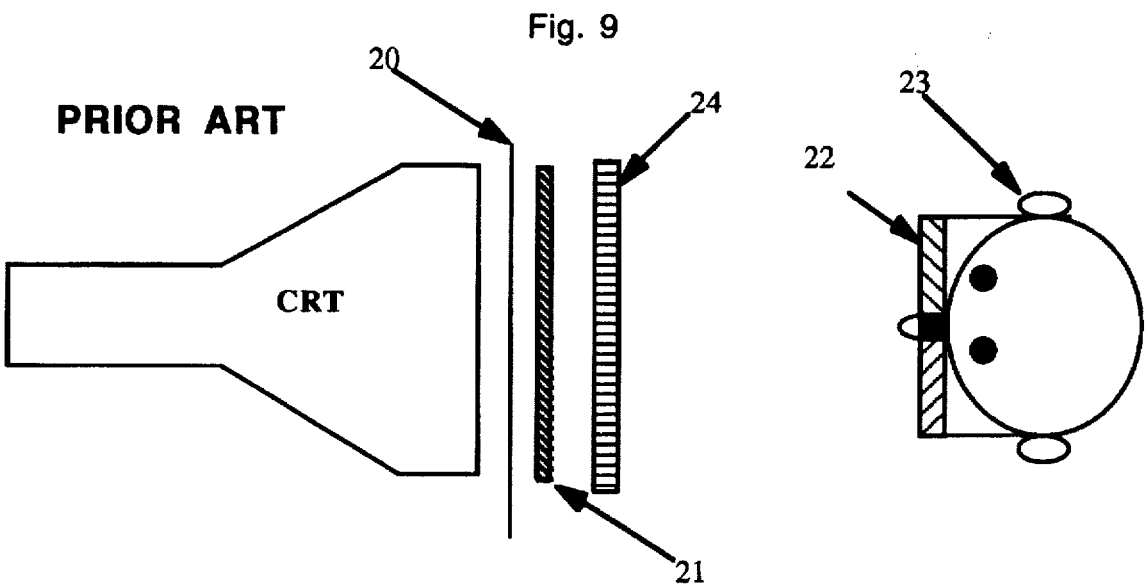
FIG. 9 illustrates a stereoscopic display of Bos.

Images are displayed sequentially upon the CRT for the viewer's right and left eye SPV, and the TN cell is switched in synchronism with the display to present one SPV with one orientation of the polarized light and the other SPV with the other orientation of the Linearly Polarized Light (LPL). The viewer (26) then wears linearly polarizing glasses (25), wherein the lenses pass LPL of orthogonal polarity, such that each eye sees substantially the SPV intended for that eye. The Bos patent of FIG. 9 differs from Byatt, primarily in that Bos uses a variable retarder rather than the TN cell of Byatt. When using a variable retarder the plane of polarization oriented at 45° to the optical axes of the variable retarder (24) and the variable retarder is switched between a state of having little or no retardation, to having half wave retardation, which similarly switches the plane of polarization through 90°. Bos also teaches variations upon this design, as in FIG. 9, where a quarter wave plate (27) (retarder) is introduced into the system, which converts the LPL to CPL of two orthogonal handednesses, when the planes of polarization are oriented at 45° to the optical axes of the retarder. The viewer (26) wears analyzing glasses (25) having circularly polarizing lenses of orthogonal handednesses to selectively present the proper SPV to his individual eyes. By using a variable retarder (24) as Bos teaches, the quarter wave plate (27) can be placed on either side of the variable retarder. This is because the linear polarizer (23) and the quarter wave plate (27) in combination, is the common way to make a circular polarizer. Thus both elements can be replaced by a circular polarizer in the place of the linear polarizer (23) as in FIG. 8 and since the half wave retardation changes the handedness of CPL, the same result is obtained. In this configuration or that of FIG. 9, the technique of combining color fields of the individual SPVs to create mixed "displayed" images can be used, by merely changing the analyzing glasses to decode the mixed images. This is done by using CLC filter/mirrors in the lenses of the analyzing glasses, with the lenses transmitting the CPL of mixed handedness to the individual eyes of the viewer. This constitutes one embodiment of the present invention.

Another configuration producing the mixed SPVs involves changing the initial circular polarizer (23) of the last case, to a CLC polarizer of mixed handedness, the colors of each handedness of light corresponding to the color make up of the mixed image. In each mixed image one color from each SPV is of one handedness, while two colors from the other SPV is of the orthogonal handedness transmitted by the filter/mirror. When this is done, then the individual lenses of the analyzing glasses can be of a single handedness, as in the variation of the Bos patent. The failure of this system is that the CLC filter/mirrors eliminate the light not transmitted by the filter/mirror by reflecting this light, rather than absorbing it as most polarizers do. These filter/mirrors then also reflect the room lights back to the viewer in CPL of a handedness that is orthogonal to that being displayed. This light passes to the viewer's eye(s) those reflected colors the eye is not seeing in the display, which greatly degrades the display. For this reason CLC filter/mirrors are far more practical for projection displays. This is not a problem when the LC polarization switching cells are placed in the analyzing glasses, since very little light comes to the lenses from the eye side of the lens. The benefits of this technique are that the switching demands upon the polarization switching cell(s) are greatly relaxed and simpler, slower switching cells can be used. By using the technique of mixed SPV video display, even LCDs can be switched rapidly enough to produce stereoscopic displays with polarization "switches" as described by Byatt and Bos.

The technique of mixed SPVs can also be used in encoding and decoding (PEM) stereoscopic hardcopy and in doing this, much of the shading of the display, which occurs because there are areas of each eye's view of the display that are "unwritten", become far less apparent. The shading is most apparent in the image of brightly colored objects and this is where this technique is most beneficial, in that it presents stimulus to the eye in the normally "unwritten" areas and it also gives a more complete SPV, making the display more pleasing.

Figure 10:
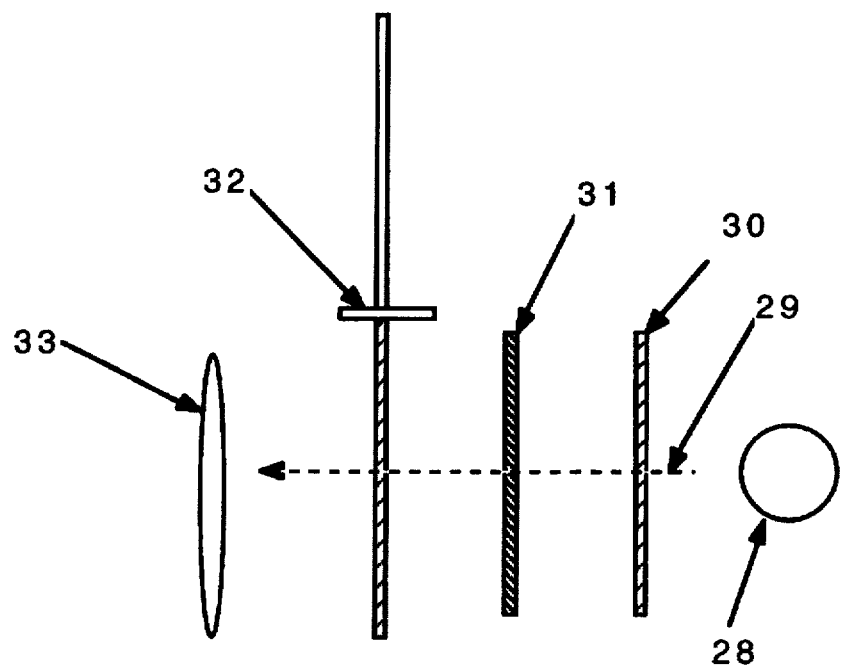
FIG. 10 illustrates a stereoscopic projection means to display the recorded stereoscopic display produced by the camera of FIG. 6.

The projection of individual SPV interlace on film or video can be performed by the device of FIG. 10, which is illustrated for the projection of film (30). In this illustration a light source (28) produces light (29) that is spatially and color encoded by motion picture film (30), whereupon the unpolarized light proceeds to a polarizer (31), which polarization encodes the colored light of this display. This element (31) can be either a total spectrum circular polarizer of either conventional or CLC type or it can be a mixed handedness polarizer of the CLC type. If the polarizer (31) is of the single handedness type, then polarization decoding glasses of the mixed polarization type must be used and if the polarizer (31) is of the mixed handedness type, then conventional or CLC, single handedness decoding glasses may be used by the viewer. Having been polarization encoded, the light proceeds to the shutter/polarization changer or polarization switching element (32), which is of the same construction as the same element found in the camera of FIG. 6 and 7. The color, spatial and polarization encoded light then proceeds through the projection lens (33) to a polarization preserving screen (not shown), where it is reflected to the eyes of the viewer, through the polarization decoding glasses, described above. An additional item of this projection system, which is not shown, is a condensing or collimation lens between the light source (29) and the film (30). It may also be advisable to place a CLC Infra Red (IR) filter/mirror at the collimation lens, to minimize the heating of the system components. This is a CLC filter mirror made of two layers, each layer reflecting the opposite handedness of IR as that of the other. It may also be beneficial to incorporate "notch filters" in the light source. In the case of video projection, the light source (28) and the photographic film (30) are replaced by a projection display device.

Figure 11:
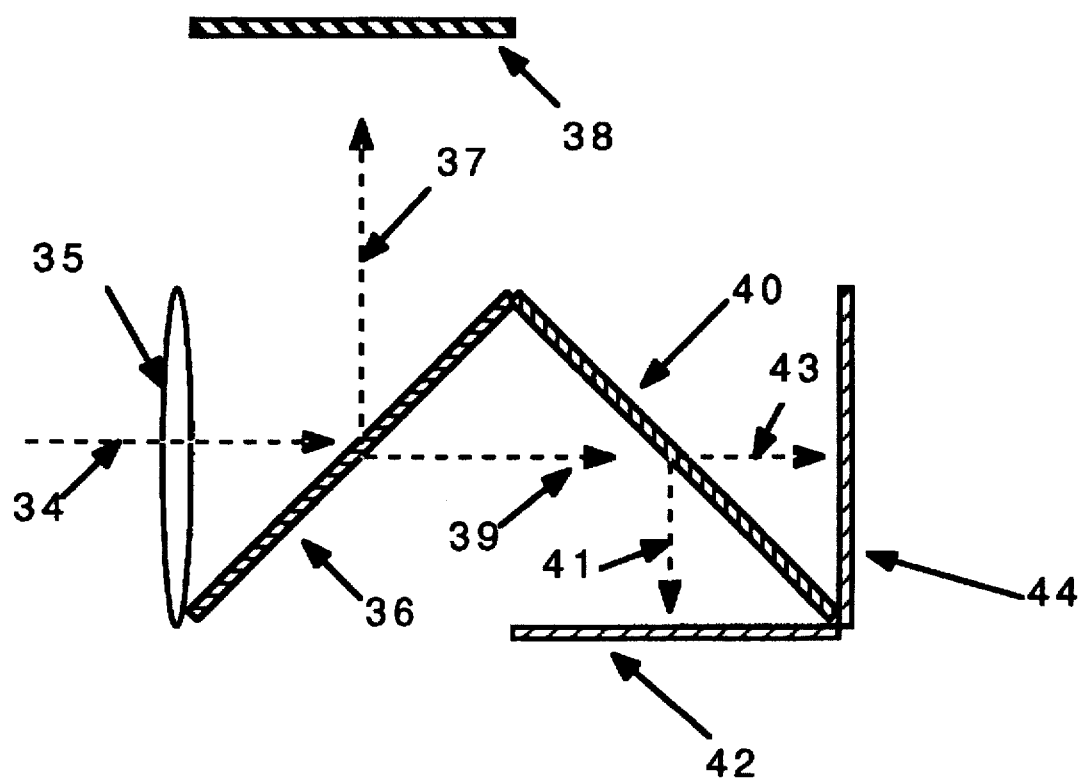
FIG. 11 illustrates a camera using CLC filter/mirrors (36 and 40) to separate the light into three component colors (37, 41 and 43) and direct said light to light sensitive targets (38, 42 and 44).

Another camera arrangement utilizing CLC filter/mirrors is illustrated in FIG. 11. This device is a highly efficient monoscopic camera that utilizes no PEM or image mixing optics and two separate and identical cameras are used to produce the SPVs in stereoscopic applications. The device finds application in: producing video for the stereoscopic display device of U.S. patent application Ser. No. 08/291, 666; as an SPV image mixing video camera; as an alternative way to expose the three film layers of each SPV for the stereoscopic photographic process to be discussed next; and when configured such that the targets (38, 42 and 44) within the camera are replaced with monochromatic display elements, the camera is transformed into a highly efficient projector. This device contains two CLC filter/mirrors, each of which is comprised of the CLC material, reflecting both handedness of one color. And these filter/mirrors should be of the multi-layer (CLC layer deposited upon CLC layer) type to avoid geometry and focus problems resulting from path length differences for the two handednesses of the reflected light. In the FIG. 11 illustration of the camera, unpolarized light (34) passes through the objective lens (35) and travels to the first CLC filter/mirror (36), where one color of the light of both handednesses (37) is reflected out of the beam. This first color of light (37) is directed to and focused upon the target (38) of the first color.

The light (39) which was not reflected by the first CLC filter/mirror (36) travels to a second CLC filter/mirror (40), whereupon a second color of both handednesses (41) is reflected out of the beam, to the target (42) of the second color. The remainder of the unreflected beam (43) constitutes the third color and this light (43) proceeds to the target (44) of the third color. This camera provides both high resolution and high sensitivity, since a photographic quality image is delivered to the targets with no significant amount of light being absorbed by the filter/mirrors. This system also has the advantage that the objective lens(es) do not need to be chromatically corrected to any significant extent, since the individual target positions or locations can be adjusted slightly to compensate for differences of the color image locations resulting from dispersion of the objective lens(es). This is to say that the image focus can be adjusted for the three colors individually. Also the angles with which the CLC filter/mirrors are inclined relative to the axis of the device are unimportant, as long as the reflected light will be able to proceed to the individual targets unimpeded and undistorted. Since the light does encounter the filter/mirrors at an angle, some care should be exercised in the formulation of the CLC materials to reflect the desired spectral distribution of light at the angle with which the filter/mirrors are deployed. The targets themselves can be loosely defined. Nearly any light sensitive medium or device can be used. Commonly, a CCD target would be used for video output from the camera, but photographic film might also be used, as will be shown. To create the mixed SPV image for a display application, the designated one color target of one camera is "clocked out" or "read out" with the two designated color targets of the other camera, for one frame and the selection of targets in the two cameras is reversed for the subsequent readout, having no two targets processing the same color in a single readout or frame of video. This system is simple and highly efficient, in that no light is directed into light absorbers.

In U.S. Pat. No. 5,398,131, the following method is described for the production of photographic film for stereoscopic motion picture display. The method uses the CLC material as the dyes in a photographic film process for stereoscopic presentations. One way which this can be done involves the use of color sensitive photolithographic type emulsions. With said emulsions made very thin (estimated from 1 to 6 microns thick) compared to the normal photolithographic emulsions, which tend to be very thick (about 100 microns or more for the similar, Vectograph Matrix Films). The film consists of three layers of these emulsions, each sensitive to a different band of visible light, having a sensitivity distribution much like the reflective color distribution of the LC inks of FIG. 1. A negative emulsion is used for the most simple and practical rendering of this process. For either a positive or negative emulsion, exposure to light causes a chemical change to occur in those emulsions sensitive to the colors of light used. The difference between positive and negative photolithographic emulsions is evident during development of the emulsions, at which time the positive emulsion will be diminished or be completely removed where it was exposed, whereas the negative emulsion will be entirely removed where it was not exposed and somewhat diminished in thickness where it was incompletely exposed. Thus with either the positive or negative photolithographic emulsion the picture is preserved in relief, although reversed between the two cases. In any case, after normal developing of the three film emulsions for each SPV, the emulsion layers are delaminated and any filters used in the film are discarded. Then, one can either pursue a direct or indirect application of the LC ink or dye. In either case, when negative emulsions are used, a LC ink is used that corresponds to the exposure color of the emulsion layer, i.e. the red sensitive emulsion layer would receive a LC ink that reflects red light of one handedness. The LC inks of preference are the CCLC-S inks from Wacker Chemie, the application of which is discussed in detail after the treatment of the film processing. The alternate method of acquiring the exposed photographic film is to use the camera of FIG. 11. This camera allows the use of inexpensive "black and white" film, with no filter layers, which considerably simplifies the development of the film. The complexity of the camera itself and the use and handling of six rolls of film rather than the two rolls of conventional stereoscopic cameras, offers certain disadvantages.

Figure 12:
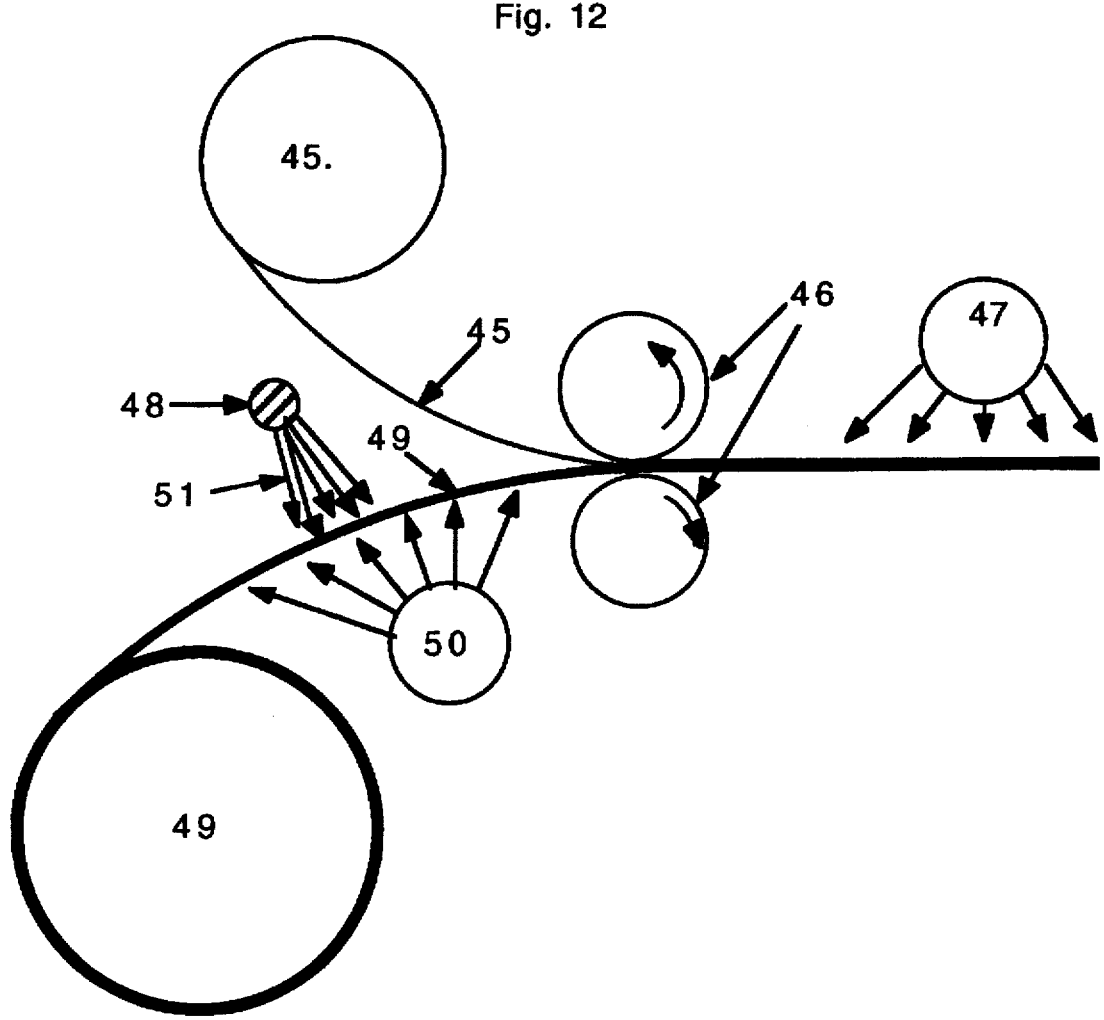
FIG. 12 illustrates the direct method of LC ink (51) encoding photographic film (49) with a coverlet (45) being applied to the film layer.
Figure 13:
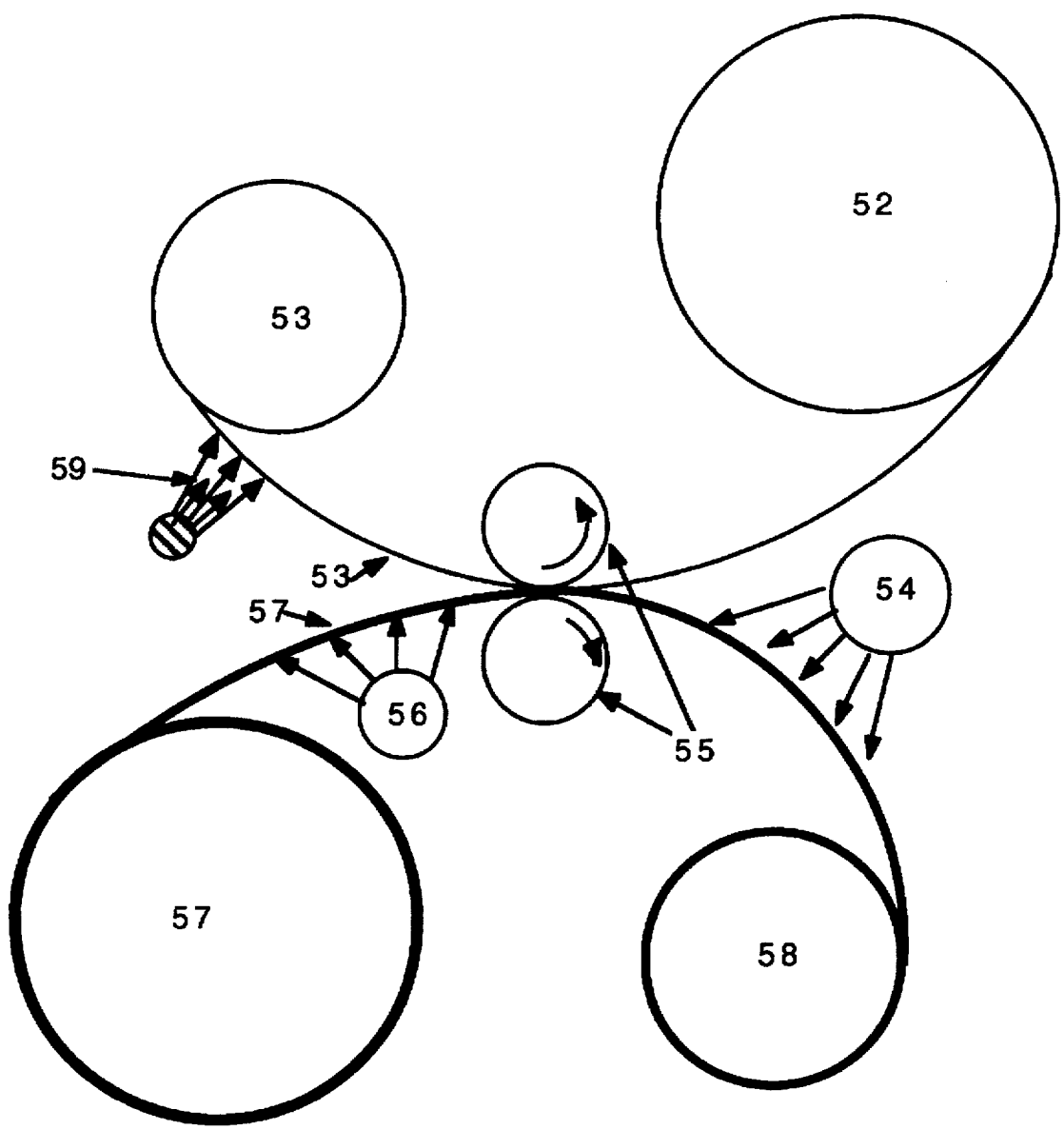
FIG. 13 illustrates the indirect method of LC ink encoding photographic film, with the LC ink predeposited on a transfer film (57).

There are both direct and indirect methods of processing the developed photolithographic film emulsion layers (3 per SPV) to make film suitable for stereo projection. The direct method of LC ink (51) encoding photographic film (49) with a coverlet (45) being applied to the film layer is illustrated in FIGS. 12 and 14. In this process developed photographic film (49) is heated by an IR or hot air source (50) and photo-setting LC ink or dye (51) is applied to the film (49) from a dispenser (48). The photographic film (49) together with a coverlet film (45), possibly having an alignment layer on it, is laminated together with rollers (46) and the LC ink (51) in the laminate is converted to the solid state by a UV light (47) which photo-sets the LC ink. UV light (47) could also be an IR light if thermal setting LC ink were used. The encoded film then goes to an optional emulsion removal process. If an alignment layer is used on the coverlet (45) or below in FIG. 13, on the transfer film (57), care should be taken that the direction of the alignment layer is complementary to the direction of the LC alignment stemming from the rolling or squeegee action. The indirect method of producing polarization and color encoded photographic film (58) with the LC ink predeposited on the transfer film (57) is illustrated in FIGS. 13 and 15. The process begins by applying and curing if necessary a release agent (59) (mould release) to the photoemulsion of the developed photolithographic film (53). This process may be performed separately before beginning the CLC application process and the release agent may be best evaporated or sublimated upon the developed photoemulsion, because its thickness must be limited to a fraction of a micron. The deposition of the release agent is the most critical aspect of the indirect encoding process. Then, after the deposition of the release agent, the raw transfer film (57), having an optional alignment layer and a thin layer of either unactivated or activated CCLC-S ink predeposited on it (not shown) is heated by heat source (56) to soften and activate the LC ink which is then run through squeegee rollers (55) together with the developed photolithographic film (53), such that the emulsion is impressed in the LC ink layer of the transfer film (57). At this time (not shown) the UV light (54) can photo-set the LC ink layer or this may be done after the film layers are separated, as is shown. The photo film is then picked up on a spool (52) to possibly repeat the process, while the transfer film (58) is also spooled for later lamination with other emulsion layers. There are two minor variations of this indirect process, in one case the transfer film has a thin layer (1 or 6 microns thick) of the CCLC-S or other suitable LC ink, either activated or unactivated, predeposited on it, as was illustrated and in the other case the ink is applied as in the direct case (FIG. 12), just before the photo film and the transfer film go through squeegee rollers. In either case, the process must be performed at the activation temperature of the CCLC-S inks (60° to 90° C.) and the excess ink accumulates at the rollers and is discarded at the edges of the film.

In comparing the direct and indirect encoding processes, the direct process seems to have an advantage in that the LC ink is reasonably well secured in place and in thickness until the LC ink can be photo-set with the UV light (47) as shown in FIG. 12. This is not the case for the indirect method where the photographic information is transferred to a second piece of film (Transfer Film) and then photo-set. In the indirect case to insure the quality of the pictorial and color information, the photo and transfer films may have to be held or pressed together until the photo-setting process is complete or nearly so. There is also some concerns regarding the use of a mould release on the emulsion and how reliable this process can be made, as well as concern that the mere presence of the mould release on the emulsion, degrades the quality of the reproduction by the CLC inks. On the other hand, the direct process appears to be relatively process intensive and therefore somewhat expensive, perhaps too expensive to make many copies by the same process. The LC inks of preference are the CCLC-S inks from Wacker Chemie, which in the direct process of FIG. 12, can be hot (60° to 90° C.) rolled or squeegeed over the emulsion (61) in FIG. 14, where the thickness of the LC ink (60) becomes an inverse function of the thickness of the developed photo-emulsion (61). This is also the case for the indirect process of FIG. 15, where the drawing code is the same as for FIG. 14. Both drawings show an emulsion spacer (62), while FIG. 14 also shows the film coverlet (63). Experiments indicate that over a small range of LC ink thickness, the amount of reflected light will vary somewhat proportionally to the thickness of the LC ink layer, up to a thickness estimated at a few microns, where nearly all of the CPL of one handedness is reflected. Thus this process is able to yield color halftones in the picture.

Once the color processing is completed for all three emulsion layers of each emulsion set, the film is reconstituted by laminating the individual emulsion layers together. In this process a laminating glue such as gelatin can be used to fill the color (LC ink) layers and seal the film layers together. But very exacting registration requirements must be met for the color layers of each SPV, so index holes or other alignment aids must be present in the film layers. FIG. 16 illustrates the laminated cross section of one such SPV. In this figure, the substrate (64) supports the ink layers (65, 66 and 67) which are not identified as to specific color, but generally the inks will be of one handedness and the transmitted colors of the layers will be cyan, magenta and yellow, while the reflected colors will be red, green and blue. This process is repeated with the film taken of a subject from a second source (camera) to obtain the two SPVs. The film from one camera is developed with LC inks of one handedness and the film of the other camera is developed using the opposite handedness LC inks. These two films are then laminated together and the mixed images are projected together through a single projector, onto a metalized (polarization preserving) screen and viewed with the same type of circularly polarizing lenses used with the LC stereo hardcopy and stereo computer terminals. A criticism that is often applied to stereo displays of all types is that they are very dim and/or have poor resolution. But because the CLC inks are very efficient in reflecting light of a specific color and they have virtually no effect on the light of other colors, they may be layered to achieve a large and bright color gamut without any loss of resolution. These advantages can also find application in monoscopic color printing and displays.

Figure 17:
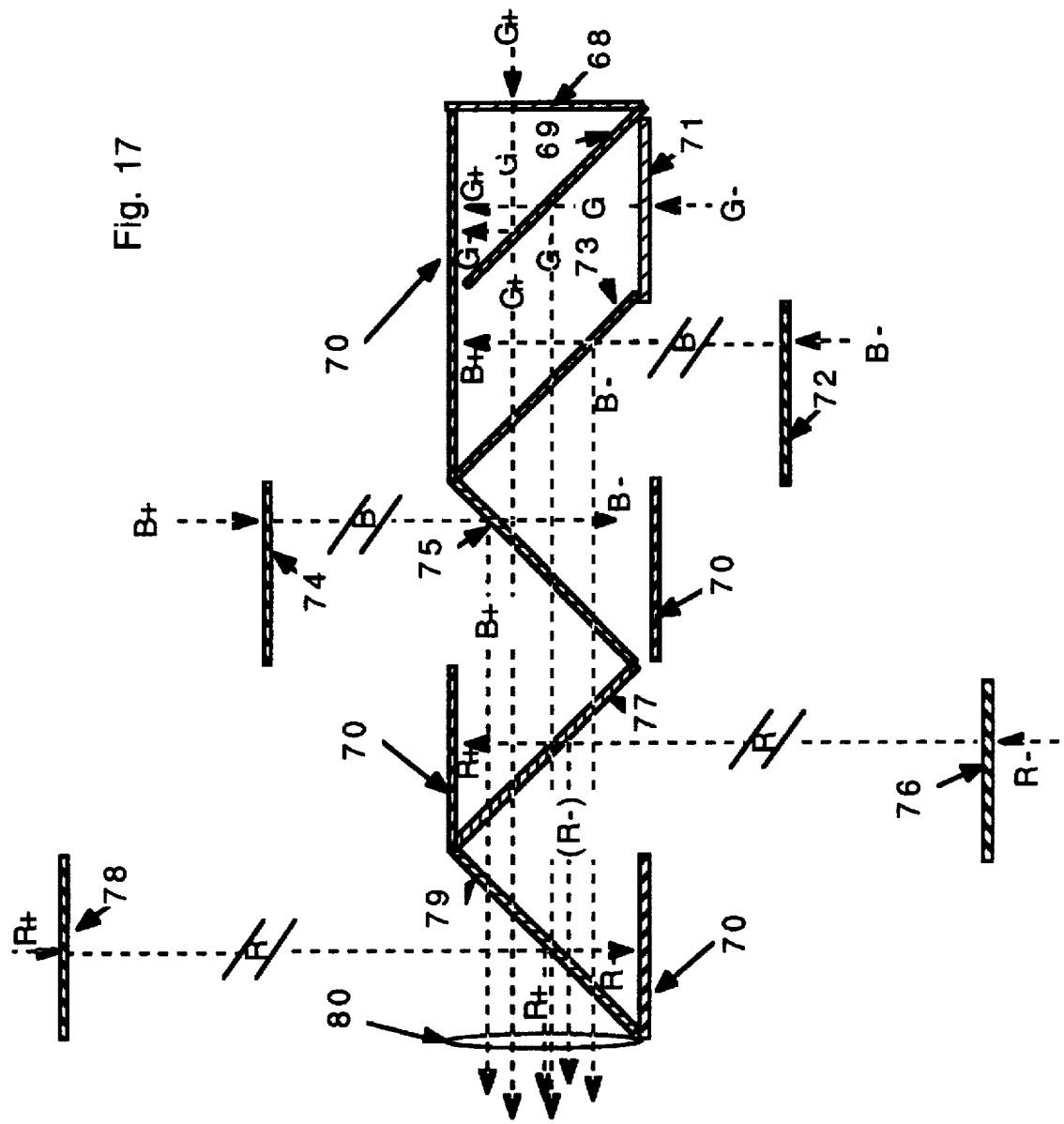
FIG. 17 illustrates a LCD stereoscopic projector using CLC filter/mirrors with an efficient light source.

Earlier it was mentioned that the camera of FIG. 11 could be made into an efficient projector. A related projector for stereoscopic projection is illustrated in FIG. 17. This device also uses CLC filter/mirrors to direct and combine the color images of the display, but two displays or SPVs are presented, with each being encoded with CPL of a handedness or combination of handednesses unique to the image of the specific SPV. In this way each SPV can be decoded to the individual eyes of the viewer by decoding glasses, which transmit substantially only the handedness of CPL of the SPV so encoded to each of the viewer's eyes, whereby the viewer perceives a stereoscopic image. In reference to the illustration of FIG. 17, which illustrates a projector, wherein the display elements (68, 71, 72, 74, 76 and 78) are LCD elements, which can encode CPL both spatially and in polarization handedness. The LCD element is an array of cells, which can be switched so that the cell has no effect upon the light passing through it or to a state where the cell forms a half wave retarder. The device can also be configured using linearly polarized light and quarter wave plates on the output, but this increases the complexity or reduces the efficiency for very little advantage in most applications. That slight advantage is improved stability with temperature changes, but as is shown in U.S. patent application Ser. No. 08/291,666 this can be achieved by other, more simple means. Thus, each LCD element modulates color light to two handednesses, which is called polarization modulation. One handedness for the light that is to be projected and the second handedness to be discarded. The process of discarding the unwanted CPL is referred to as intensity modulation, which involves more than the two switched states producing the two handednesses of CPL thus far discussed. This is because there is the desire to have colors of intensity intermediate between the fully switched states, this is referred to as halftones or halftone states. The halftone states are achieved by virtue of the fact that there are intermediate states of polarization between the two handednesses of CPL. As the retardation of a cell is changed from the one fully switched state to another, the intensity of the light reflected from a CLC filter/mirror of the specified color, will vary as a $Cos^2$ function of the retardation. As the retardation is changed, the CPL first becomes slightly elliptically polarized, then increasing elliptically polarized, and when the cell has a quarter wave retardation, the light is linearly polarized. Changing the retardation further, the light becomes highly elliptically polarized of the opposite handedness, with still further changes of retardation reducing the ellipticity, until when the cell is fully switched, the light is circularly polarized of the opposite handedness. To understand the effect of a CLC filter/mirror upon elliptically polarized light, it is possible to model elliptically polarized light as a combination of circularly polarized light and linearly polarized light. The CLC filter/mirror will reflect or transmit, depending upon the handedness of the filter/mirror and the CPL, all the circularly polarized light and in addition the filter/mirror will both transmit and reflect one half of the linearly polarized light. Thus by these means, any level of intensity is possible in any color of the display.

In FIG. 17 there are six display elements (LCDs), three which produce each SPV, in two handednesses of CPL, each handedness of CPL not being confined to a specific SPV (SPV of mixed handedness are possible). Each display element polarization modulates a light of a specific color and handedness and as such each display element can be tailored to its specific requirements, such as providing the optimal retardation for the color of light to be modulated by the individual display element. All of the display/CLC filter/mirror elements perform basically the same function as described above. Referring to the illustration of FIG. 17, light of one handedness is designated as a (+) state and light of the orthogonal handedness is designated as a (-) state, with these designations occurring next to the color designation of R, G or B. Light having possibly both handedness, has no designation other than color. In the illustration green CPL of one handedness (G+) enters the display element #68 and it is polarization modulated, the modulated light passes to CLC filter/mirror #69, which will reflect green light of the opposite (-) handedness to said one handedness and transmit light of said one handedness (+), which passes through all CLC filter/mirrors in its path to the projection lens (80), which focuses an image of display element #68, upon a display screen (not shown). In this case the CPL reflected by CLC filter/mirror #69 (unwanted light from display element #68) is directed to a light absorber (70). The same filter/mirror (69) also intensity modulates the encoded light from the other green display element (71), which is possible because the light to be displayed, is of the opposite handedness from the one handedness of the light displayed by the first green display element (68) and it is reflected rather than transmitted as the display light of the first green display element (68) was. Upon reflection of the light from CLC filter/mirror (46), the light passes through the other CLC filter/mirrors in its path and is focused by the projection lens #80. And due to optics used, the image of the second green display element (71) appears to coincide with the image of the first display element (68), as will the images of all the display elements. And in this case the unwanted light from display element #71, is transmitted by CLC filter/mirror #69, so that it too passes into the light absorber (70). Similarly the light from display element #72 is intensity modulated and directed by CLC filter/mirror #73; the light from display element #74 is intensity modulated and directed by CLC filter/mirror #75; the light from display element #76 is intensity modulated and directed by CLC filter/mirror #77; the light from display element #78 is intensity modulated and directed by CLC filter/mirror #79. This then allows the projection of a polarization encode stereoscopic display upon a polarization preserving screen to be perceived by a viewer wearing the proper polarization decoding glasses.

Figure 18:
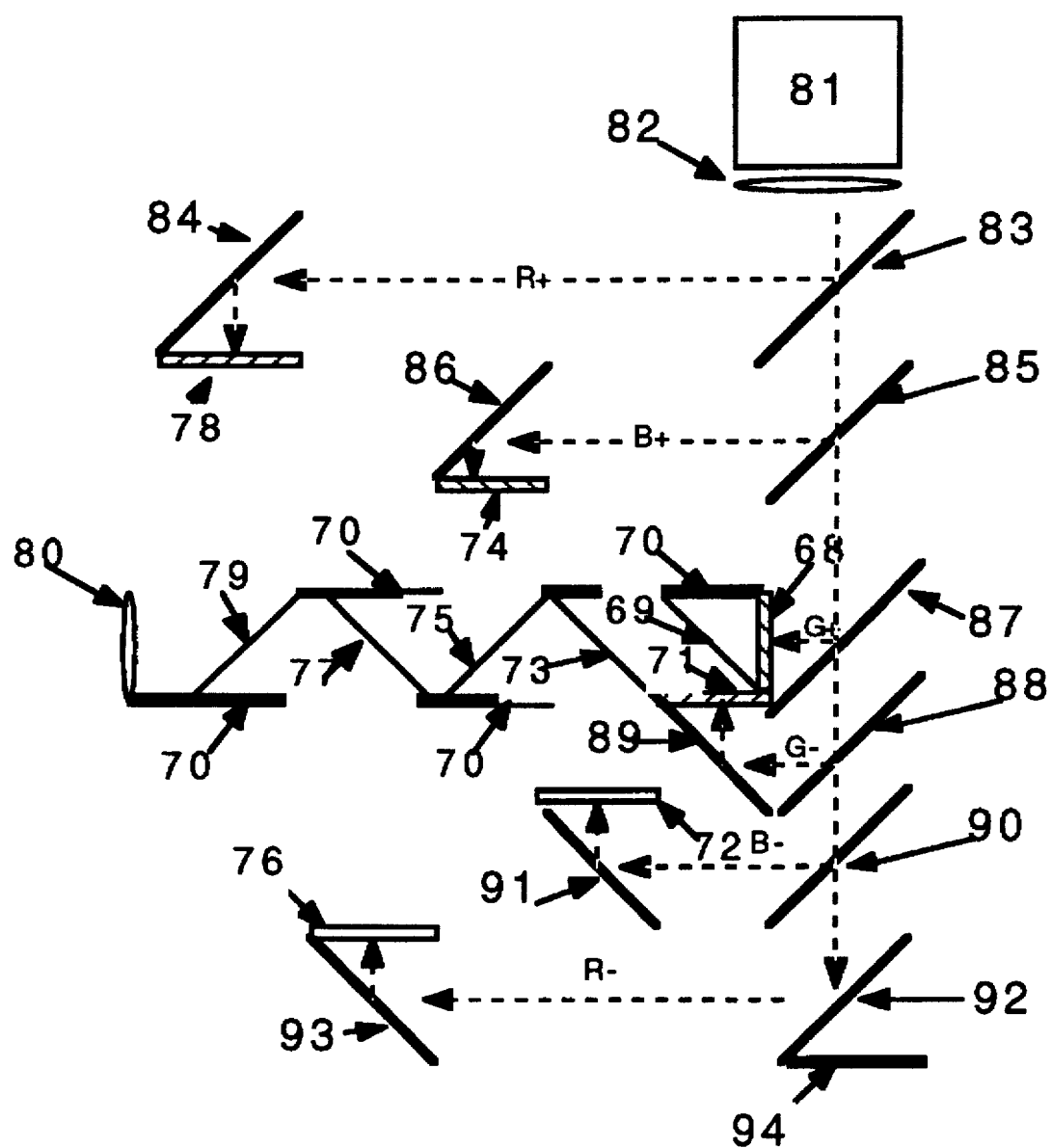
FIG. 18 illustrates the projector of FIG. 17 together with a polarizing light source using CLC filter/mirrors.
Figure 19:
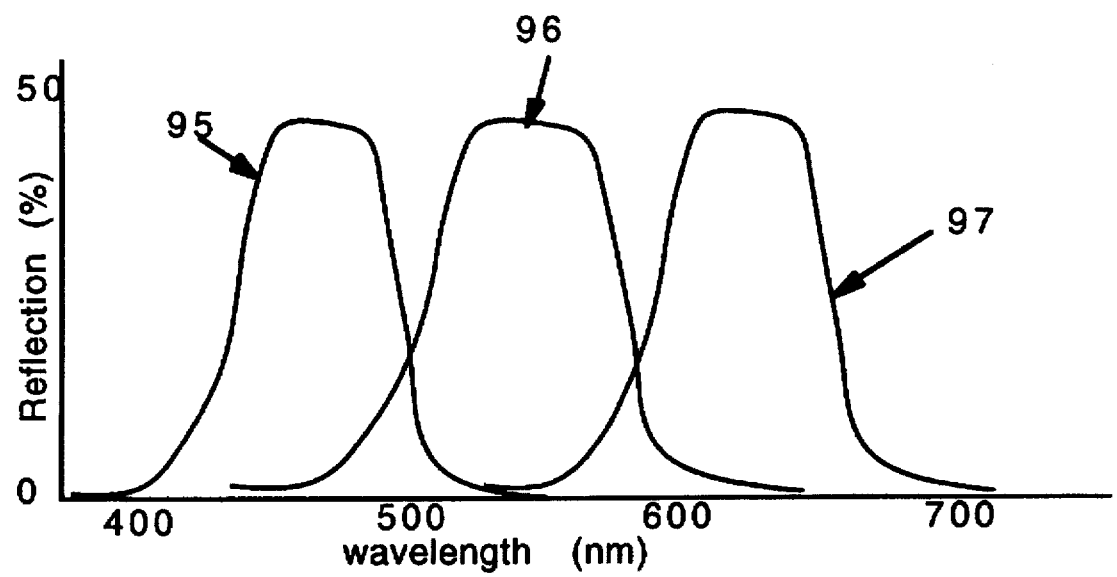
FIG. 19 illustrates the spectral response of CLC filter/mirrors having a narrower color range than those of FIG. 1.
Figure 20:
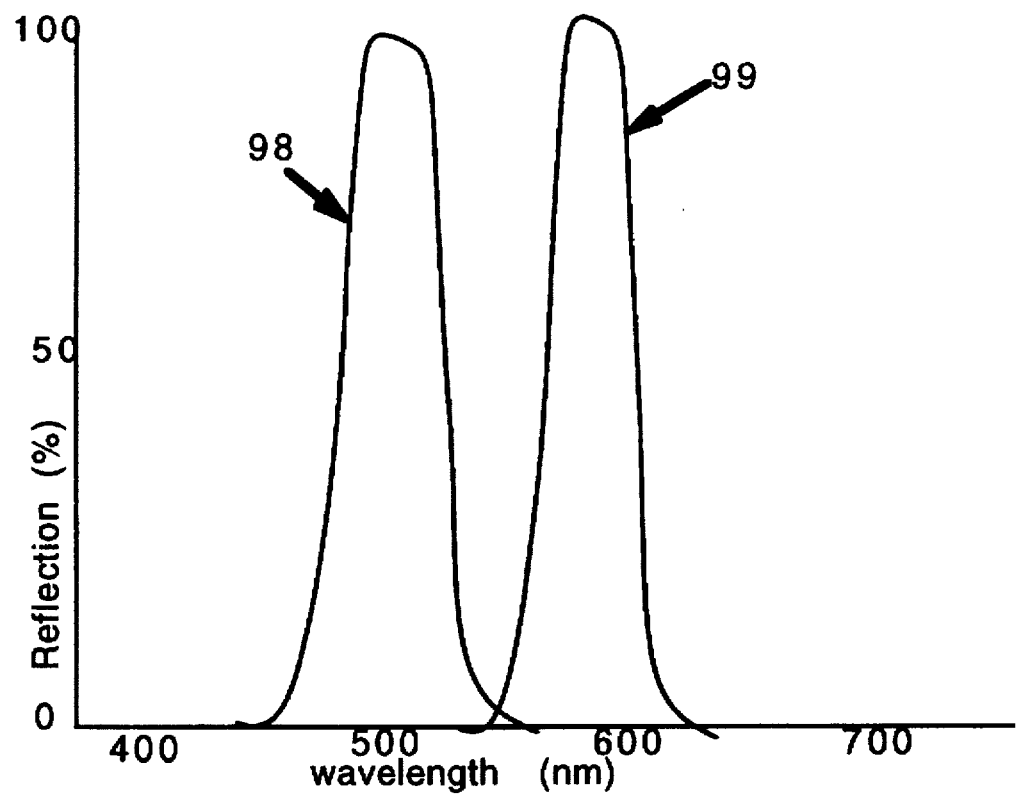
FIG. 20 illustrates the spectral response of CLC notch filter/mirrors.

The projector of FIG. 17 requires a polarizing light source of specific color for each of the display elements and again CLC filter/mirrors can be used to efficiently separate and polarize light for this purpose. One such light source, together with the projector of FIG. 17, is illustrated in FIG. 18. The projector of FIG. 17 is illustrated with identifying number 68 through 80 (smaller than the new numbers). A light source (81) generates unpolarized, white light, which is collimated by collimation lens #82. Within the light source (81) or near the collimation lens (82), it may be desirable, although not necessary to introduce several CLC filter/mirrors. One set of filter/mirrors could be introduced to remove any Infra Red (IR) radiation from the light, to minimize any component heating in the projector and a set of "notch" filter/mirrors could be introduced to remove small spectral bands of light at the edges or sides of the spectral distributions of the CLC filter/mirrors, for the purpose of improving the contrast and color gamut of the display. The need for any notch filters, very much depends upon the matching of the filter/mirror spectral distributions to the spectral distributions of the component colors of the display light or merging the spectral distributions of the filter/mirrors themselves to cover the visible spectrum. If the spectral distributions are merged as illustrated in FIG. 1, then there is very little need for any notch filters, aside from increasing the color gamut and possibly decreasing a type of "object flicker" unique to the mixed image display. If these distributions are narrower and less tightly matched, as with curves #95, 96 and 97 in FIG. 19, then it may be desirable to remove the light at the interface of the distributions, as is done with the curves of notch filers #98 and 99, reflecting both handedness of light, in FIG. 20. Also, as noted the light reflected and transmitted by the CLC filter/mirrors is truly circularly polarized only at the center frequency of the distribution and light other than of the center frequency becomes slightly elliptically polarized, with the degree of ellipticity of the polarization increasing rapidly at the edges of the distribution, which can cause some small amount of "ghosting" in stereoscopic use if total spectrum light is used. The notch filters can be placed at any point of the viewing system, including the decoding glasses themselves. The most economic use of the filters occurs when only one set of notch filter/mirrors in placed in the projector, either before the light is modulated or at the projection lens. The component colors of many light sources are inherently of a narrow band and if the spectral distribution of the CLC filter/mirror is matched to the spectral distribution of the component colors of the light source, then, again no notch filter/mirrors are required.

In FIG. 18, the unpolarized light leaving the light source is directed to the first CLC filter/mirror (83), which reflects light of one color (R) and one handedness (+) to a second CLC filter/mirror (84), which directs the light to the display element #78 of the projector, without changing its handedness. The final reflecting filter/mirrors #84, 86, 89, 91 and 93 could be replaced with specular reflectors, that change the handedness of the light and the projector could be reconfigured in a number of ways to accommodate this and achieve the same stereoscopic display. CLC filter/mirror #83 only reflects the R+ light, allowing all other and handednesses of the light to be transmitted to CLC filter/mirror #85, which reflects only one color and handedness (B+) of the light to filter/mirror #86, which directs the CPL to display element #74. Filter/mirror #87 directs the CPL (G+) it reflects directly to display element #68, whereas filter/mirror #88 again directs the CPL (G-) it reflects to filter mirror #89 and then to display element #71. And filter/mirror #87 reflects CPL (B-) to filter/mirror #91, which further reflects it to display element #72, and finally filter/mirror #92 reflects most of the remaining light (R-) to filter/mirror #93 and display element #75. If no notch filters are used at the light source, the light source itself, as configured, does create it own notch filters. This is because in this configuration, the filter/mirrors remove just the color and handedness needed for the various display elements and any light that remains, is transmitted by CLC filter/mirror #92, whereupon it is absorbed by light absorber #94. This arrangement does, transmit some light of elliptical handedness to the viewer and as such, it does not preclude the benefits of the notch filters either at the source or at the projector lens of the device.

These and other embodiments can be practiced without departing from the true scope and spirit of the invention, which is defined by the following claims.

What is claimed is:

1. A method of presenting a stereoscopic display to a viewer, said display being composed of a pair of stereoscopic images, said method comprising:

printing the pair of stereoscopic images together on a print medium with color and polarization encoding chiral nematic liquid crystal and filter inks, thereby forming a composite image, with the color and polarization encoded composite image reflecting and transmitting polarized light wherein the polarization orientation of the light from each specific color field of one of said pair of stereoscopic images is substantially orthogonal to the light from the corresponding color field of the other of said pair of stereoscopic images, and presenting said composite image to a viewer wearing polarization decoding glasses, wherein the lenses of said glasses transmit circularly polarized light, with the polarization orientation of said light being configured to substantially allow the light from one of the images of said pair of stereoscopic images to be transmitted through only one of said lenses and the light from the other image of said pair of stereoscopic images to be transmitted by the other of said lenses, whereby the viewer perceives said stereoscopic display.

2. A method of presenting a stereoscopic display according to claim 1, wherein the color and polarization encoding inks, forming the color fields of each of said images of the pair of stereoscopic images, being polarization encoded with the polarization oreintation of at least one of the color fields of said image having its polarization oreintation orthogonal to at least one other color field of said image.

3. A method of presenting a stereoscopic display according to claim 1, wherein the color and polarization encoding inks, forming the color fields of the pair of stereoscopic images, are intimately mixed in their deposition, forming said composite image.

4. A method of presenting a stereoscopic display according to claim 1, wherein the color and polarization encoding inks, forming the color fields of the pair of stereoscopic images are deposited in superimposed, coextensive layers, forming said composite image.

5. A method of presenting a stereoscopic display according to claim 1, wherein said print medium is transparent and the transmitted polarized light from said composite image is projected upon a polarization preserving screen, whereupon the light of said composite image is reflected to a viewer wearing polarization decoding glasses, the lenses of which transmit circularly polarized light, with the polarization orientation of said light being configured to substantially allow the light from one image of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives said stereoscopic display.

6. A method of presenting a stereoscopic display according to claim 5, wherein each specific color field of said composite image is comprised of a color and polarization encoding dye layer that has been pictorially encoded by an emulsion layer of photographic film, said emulsion layer being of one specific color and one image of said pair of stereoscopic images.

7. A method of presenting a stereoscopic display according to claim 1, wherein said print medium is transparent and the transmitted polarized light from said composite image is viewed directly, through said polarization decoding glasses by said viewer.

8. A method of presenting a stereoscopic display according to claim 1, wherein said composite image is projected upon a polarization preserving screen, whereupon the light of said composite image is reflected to a viewer wearing polarization decoding glasses, the lenses of which transmit circularly polarized light, with the polarization orientation of said light being configured to substantially allow the light from one image of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives said stereoscopic display.

9. A method of presenting a stereoscopic display to a viewer, said stereoscopic display being composed of a pair of stereoscopic images each having at least two specific color fields, said method comprising:

provviding a polarization encoding display medium composed of an array of color specific polarization encoding area elements spatially distributed along at least one axis in first and second sets such that each area element of the first set is separated along said one axis from other elements of the first set and of the same specific color by at least one element of the second set and each area element of the second set is separated along said one axis from other elements of the second set and of the same specific color by at least one element of the first set, and wherein for each specific color, each area element in the first set reflects light of its specific color in one polarization orientation and transmits light of its specific color in an orthogonal polarization orientation and each area element of the second set reflects light of its corresponding specific color in said orthogonal polarization orientation and transmits light of its corresponding specific color in said one polarization orientation, and for each specific color, the color field of one image is associated with the first set of area elements and the color field of the other image is associated with the second set of area elements, spatially segmenting each specific color field of each image of the pair of stereoscopic images in accordance with the spatial distribution of the color specific area elements that reflect substantially the same specific color as said specific color field and are in the set of polarization encoding area elements associated with said specific color field, imposing spectral filter inks corresponding to each segmented color field of each image upon only those color specific area elements that reflect substantially the same specific color as said segmented color fields and are in the set of polarization encoding area elements associated with said segmented color field, and equipping the viewer with polarization decoding glasses having lenses that transmit light polarized in said first and second orientations for the specific color fields, whereby the polarization encoded color fields of each image of said pair of stereoscopic images, derived from at least one set of area elements are transmitted to the proper respective eyes of the viewer, such that when light passes through the color fields imposed on the polarization encoding display medium and is directed toward the viewer by the polarization encoding display medium, a stereoscopic display is presented to the viewer.

10. A method according to claim 9, wherein color specific fields are imposed upon said color specific area elements with spectral filter inks which absorb light of a specific color, said color substantially corresponding to the specific color of said color field and the color reflected by said color specific area elements.

11. A method according to claim 9, wherein the color specific polarization encoding area elements of a first specific color are in a first layer and the color specific polarization encoding area elements of a second specific color are in a second layer that extends over the first layer, and the color specific polarization encoding area elements in the first layer are substantially coextensive with respective color specific polarization encoding area elements in the second layer.

12. A method according to claim 9, wherein the color specific polarization encoding area elements are of substantially equal extent along said axis, and ordered but non-coextensive, the polarization encoding area elements in each set for a specific color being displaced along said axis relative to polarization encoding area elements in that set for at least a second color by an amount less than the extent along said axis of the color specific encoding area elements.

13. A method according to claim 9, wherein the color specific polarization encoding area elements are distributed along first and second axes that extend transversely of each other.

14. A method according to claim 9, wherein each stereoscopic image field comprises three primary color fields, one of said primary color fields being said first specific color field and the other two primary color fields forming said second specific color field.

15. A method according to claim 9, comprising imposing a first segmented specific color field of one image of the pair of stereoscopic images on the first set of area elements and a second segmented specific color field of said one image on the second set of area elements, and imposing said first segmented specific color field of the other image of the pair of stereoscopic images on the second set of area elements and said second segmented specific color field of said other image on the first set of area elements.

16. A method according to claim 15, for presenting a plurality of frames of the stereoscopic display to the viewer in succession, each frame of the stereoscopic display being composed of a pair of stereoscopic images, and wherein the polarization encoding display medium comprises at least first and second display frames, each containing an array of color specific polarization encoding area elements spatially distributed along said one axis in first and second sets, the locations of the first and second sets of color specific polarization elements in the second display frame are transposed relative to the locations of the first and second sets in the first display frame, and the method comprises recording first and second frames of the stereoscopic display on the first and second display frames respectively, and presenting the recorded first and second frames of the stereoscopic display successively to the viewer, whereby the segmented images that form the successive frames of the stereoscopic display are temporally interlaced with the segmented color fields constituting substantially half of each image of said pair of images being presented to the viewer in each frame of the display.

17. A method according to claim 9, for presenting a plurality of frames of the stereoscopic display to the viewer in succession, each frame of the stereoscopic display being composed of a pair of stereoscopic images, and wherein the polarization encoding display medium comprises at least first and second display frames, each containing an array of color specific polarization encoding area elements spatially distributed along said one axis in first and second sets, the locations of the first and second sets of color specific polarization elements in the second display frame are transposed relative to the locations of the first and second sets in the first display frame, and the method comprises recording first and second frames of the stereoscopic display on the first and second display frames respectively, and presenting the recorded first and second frames of the stereoscopic display successively to the viewer, whereby the segmented images that form the successive frames of the stereoscopic display are temporally interlaced with substantially half of each image of said pair of images being presented to the viewer in each frame of the display.

18. A method according to claim 9, wherein the color specific area elements that are in the first set and are of said first specific color, reflect light of said first specific color with a first polarization orientation and the color specific area elements that are in the first set and are of said second specific color, reflect light of said second specific color with a second polarization orientation, which is orthogonal to said first orientation.

19. A method according to claim 9, wherein the color specific area elements that are- in the first set and are of said first specific color, reflect light of said first specific color with a first polarization orientation and the color specific area elements that are in the second set and are of said second specific color, reflect light of said second specific color with a second polarization orientation, which is orthogonal to said first orientation.

20. A method according to claim 9, comprising imposing the color fields of one image of the pair of stereoscopic images on the first set of area elements and imposing color fields of the other image of the pair of stereoscopic images on the second set of area elements.

21. A method according to claim 9, wherein said polarization encoded color fields of said pair of stereoscopic images are projected upon a polarization preserving screen, whereupon the light of said images is reflected to a viewer wearing polarization decoding glasses, the lenses of which transmit circularly polarized light, with the polarization orientation of said light being configured to substantially allow the light from one of the images of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives a stereoscopic display.

22. A method according to claim 9, wherein the polarization and color encoded light is directed to the viewer by the reflection of said light from the polarization encoding display medium.

23. A method according to claim 9, wherein the polarization and color encoded light is directed to the viewer by the transmission of said light through the polarization encoding display medium.

24. A method of presenting a stereoscopic display to a viewer, said stereoscopic display being composed of a pair of stereoscopic images each having at least two specific color fields, said method comprising:
providing a polarization encoding display medium composed of at least first and second polarization encoding display frames spaced along an axis and wherein for each of said specific color fields, the first and odd numbered frames reflects light in one polarization orientation and transmits light in an orthogonal polarization orientation and the second and even numbered frames reflects light in said orthogonal polarization orientation and transmits light in said one polarization orientation,
coextensively imposing at least a first specific color field of one image of the pair of stereoscopic images and at least a second specific color field of the other image of the pair of stereoscopic images upon the first and odd numbered polarization encoding frames,
coextensively imposing the second specific color field of said one image of the pair of stereoscopic images and the first specific color field of said other image of the pair of stereoscopic images upon the second and even numbered polarization encoding frames, and
providing sequential display of at least said first and second polarization encoding frames, and equipping the viewer with polarization decoding glasses having lenses that transmit light polarized in said first and second polarization orientations for the specific color fields, whereby the polarization encoded color fields of each image of said pair of stereoscopic images is transmitted to the proper respective eyes of the viewer, such that when light is directed from the color fields imposed on the polarization encoding display medium to the viewer, a stereoscopic display is presented to the viewer.

25. A method according to claim 24, wherein color specific fields are imposed upon said color specific area elements with spectral filter inks which absorb light of a specific color, said color corresponding to the specific color of said color field and the color reflected by said color specific area elements.

26. A method according to claim 24, wherein the first and odd numbered polarization encoding display frames reflects light of said first specific color with a first polarization orientation and reflects light of said second specific color with a second polarization orientation, which is orthogonal to said first orientation.

27. A method according to claim 24, wherein the first and odd numbered polarization encoding display frames reflects light of said first specific color with a first polarization orientation and the second and even numbered polarization encoding display frames reflects light of said second specific color with a second polarization orientation, which is orthogonal to said first orientation.

28. A method according to claim 24, wherein each stereoscopic image field comprises three primary color fields, one of said primary color fields being said first specific color field and the other two primary color fields forming said second specific color field.

29. A method according to claim 24, wherein the polarization and color encoded light is directed to the viewer by the reflection of said light from the polarization encoding display medium.

30. A method according to claim 24, wherein the polarization and color encoded light is directed to the viewer by the transmission of said light through the polarization encoding display medium.

31. A method according to claim 24, wherein the polarization and color encoded light is directed to the viewer by the transmission of said light through the polarization encoding display medium and projected upon a polarization preserving screen whereupon said polarization and color encoded light is reflected to a viewer wearing polarization decoding glasses, the lenses of which transmit circularly polarized light, with the polarization orientation of said light being configured to substantially allow the light from one of the images of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives a stereoscopic display.

32. A method of presenting a stereoscopic display to a viewer, utilizing decoding glasses worn by the viewer, said method comprised of:
providing a color and polarization encoded display, composed of the color fields of a pair of stereoscopic images, with each specific color field of one image of said pair of images being polarization encoded orthogonally to the corresponding color field of the other image of said pair of images, and providing decoding glasses, the lenses of which transmit polarized light to the viewer's individual eyes, with the selection of said polarized light resulting from the reflective and transmissive properties of aligned color specific chiral liquid crystal filter/mirror materials, being deposited coextensively, and having the polarization orientation of the specific colors of light transmitted by one lens, of the pair of lenses of said glasses, being orthogonal to the polarization orientation of the specific colors of the light transmitted by the other lens of said decoding glasses, and wherein at least one waveplate is provided in association with one color specific chiral liquid crystal filter/mirror incorporated in the lens of the decoding glasses, the purpose of said waveplate being to make at least one color of light, in substantially one polarization orientation, more nearly circularly polarized, whereupon said one color of light in said one polarization orientation is more completely reflected by said color specific liquid crystal filter/mirror, and presenting said polarization and color encoded images to a viewer wearing said decoding glasses,-wherein the individual lenses of said glasses present to the eyes of the viewer, substantially only the specific image of the pair of stereoscopic images intended for each of said eyes, whereby the viewer perceives said stereoscopic display.

33. A method of presenting a stereoscopic display to a viewer, according to claim 32, wherein the polarization orientation of the light transmitted by each individual lens is comprised of light, at least one color of which has its polarization orientation being substantially orthogonal to the polarization orientation of at least one other color of light so transmitted by said lens.

34. A method of presenting a stereoscopic display to a viewer, utilizing decoding glasses worn by the viewer, said method comprised of:

providing a color and polarization encoded display, composed of the color fields of a pair of stereoscopic images, with each specific color field of one image of said pair of images being polarization encoded orthogonally to the corresponding color field of the other image of said pair of images, and providing decoding glasses, the lenses of which transmit polarized light to the viewer's individual eyes, with the selection of said polarized light resulting from the reflective and transmissive properties of aligned color specific chiral liquid crystal filter/mirror materials, being deposited coextensively, and having the polarization orientation of the specific colors of light transmitted by one lens, of the pair of lenses of said glasses, being orthogonal to the polarization orientation of the specific colors of the light transmitted by the other lens of said decoding glasses, and wherein the polarization orientation of the light transmitted by each individual lens is comprised of light, at least one color of which has its polarization orientation being substantially orthogonal to the polarization orientation of at least one other color of light so transmitted by said lens, and presenting said polarization and color encoded images to a viewer wearing said decoding glasses, wherein the individual lenses of said glasses present to the eyes of the viewer, substantially only the specific image of the pair of stereoscopic images intended for each of said eyes, whereby the viewer perceives said stereoscopic display.

35. A method of presenting a stereoscopic display to a viewer, according to claim 34, wherein at least one waveplate is provided in association with one color specific chiral liquid crystal filter/mirror incorporated in the lens of the decoding glasses, the purpose of said waveplate being to make at least one color of light, in substantially one polarization orientation, more nearly circularly polarized, whereupon said one color of light in said one polarization orientation is more completely reflected by said color specific liquid crystal filter/mirror.

36. A method of presenting a stereoscopic display to a viewer, said stereoscopic display being composed of a pair of stereoscopic images each having at least two specific color fields, said method comprising:

a temporally refreshed display medium providing at least first and second temporally distributed display frames, and an encoding polarizer, incorporating filters that polarization encodes each of said two specific color fields, and a switchable polarization inversion means, switched in synchronism with the display of all display frames, said switchable polarization inversion means having a first switched state, providing substantially no change of polarization state for the first and odd numbered display frames, providing each of said specific color field of the first and odd numbered display frames in light having said one polarization orientation, and said switchable polarization inversion means having a second switched state, providing substantially one half wave of retardation for the second and even numbered display frames, whereby light from the second and even numbered display frames is provided in an orthogonal polarization orientation to said one polarization orientation, and imposing at least a first specific color field of one image of the pair of stereoscopic images and at least a second specific color field of the other image of the pair of stereoscopic images upon the first and odd numbered display frames, and imposing the second specific color field of said one image of the pair of stereoscopic images and the first specific color field of said other image of the pair of stereoscopic images upon the second and even numbered display frames, and providing sequential display of said odd and even numbered display frames, and equipping the viewer with polarization decoding glasses having lenses that incorporate filters that transmit light polarized in said first and second polarization orientations for the specific color fields, whereby the polarization encoded color fields of each image of said pair of stereoscopic images are transmitted to the proper respective eyes of the viewer, thus presenting a stereoscopic display to the viewer.

37. A method of presenting a stereoscopic display to a viewer, according to claim 36, wherein said temporally refreshed display medium is composed of a collimated light source, illuminating photographic color film, the frames of said film .being changed in synchronization with the switching of said switchable polarization inversion means, and projecting the polarization encoded pair of stereoscopic images upon a polarization preserving screen, whereupon said polarization and color encoded light is reflected to a viewer wearing polarization decoding glasses, the lenses of which transmit circularly polarized light, with the polarization orientation of said light being configured to substantially allow the light from one of the images of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives a stereoscopic display.

38. A method of presenting a stereoscopic display to a viewer, according to claim 36, wherein said stereoscopic display is provided by a refreshed electronic display device, including Cathode Ray Tube displays, Liquid Crystal Displays, Electro-Luminescent Displays and Plasma Display Panels.

39. A method of presenting a stereoscopic display to a viewer, according to claim 36, wherein said switchable polarization inversion means is a variable retarder, said retarder being switched between said first state of having no retardation and said second state, providing substantially a half wave of retardation for visible light.

40. A method of presenting a stereoscopic display to a viewer, according to claim 36, wherein said encoding polarizer transmits polarized light of substantially one orientation for all specific colors and the lenses of said polarization decoding glasses worn by the viewer, transmit to the viewer's individual eyes, polarized light of mixed orientations, said mixed orientations resulting from having at least one of the primary colors filters of one lens of said glasses transmitting an orthogonal polarization orientation from that transmitted by at least one other color filter of said one lens and the polarization orientation of the light transmitted by the filters of the second lens of said glasses, being orthogonal to the polarization orientation of the light transmitted by the filters of said one lens, for each color respectively.

41. A method of presenting a stereoscopic display to a viewer, according to claim 36, wherein said encoding polarizer transmits polarized light of mixed polarization orientation said mixed orientations resulting from having at least one of the primary color filters transmitting light of an orthogonal polarization orientation to the light transmitted by at least one other color filter of said encoding polarizer, and the lenses of said polarization decoding glasses worn by the viewer, transmit to the viewer's individual eyes, light of a single polarization orientation for all primary colors of the display.

42. A method according to claim 36, wherein the polarization encoded color fields of each image of said pair of stereoscopic images is projected upon a polarization preserving screen whereupon said color fields of each image are reflected to a viewer wearing polarization decoding glasses, the lenses of which transmit circularly polarized light, with the polarization orientation of said light being configured to substantially allow the light from one of said images of said pair of stereoscopic images to be transmitted through only one of said lenses and the light from the other image of said pair of stereoscopic images to be transmitted by the other of said lenses, thus each lens provides the transmission of one of said pair of stereoscopic images, whereby the viewer perceives a stereoscopic display.

* * * * *